United States Patent
Nilsson et al.

(10) Patent No.: US 10,951,297 B2
(45) Date of Patent: Mar. 16, 2021

(54) UE, NETWORK NODE AND METHODS THEREIN FOR BEAM REPORTING IN A WIRELESS COMMUNICATION SYSTEM

(71) Applicant: Telefonaktiebolaget LM Ericsson (publ), Stockholm (SE)

(72) Inventors: Andreas Nilsson, Gothenburg (SE); Fredrik Athley, Kullavik (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 175 days.

(21) Appl. No.: 16/086,464

(22) PCT Filed: Jul. 2, 2018

(86) PCT No.: PCT/SE2018/050719
§ 371 (c)(1),
(2) Date: Sep. 19, 2018

(87) PCT Pub. No.: WO2019/022657
PCT Pub. Date: Jan. 31, 2019

(65) Prior Publication Data
US 2020/0228182 A1 Jul. 16, 2020

Related U.S. Application Data

(60) Provisional application No. 62/537,988, filed on Jul. 28, 2017.

(51) Int. Cl.
*H04B 7/08* (2006.01)
*H04B 7/06* (2006.01)

(52) U.S. Cl.
CPC ........... *H04B 7/0695* (2013.01); *H04B 7/088* (2013.01)

(58) Field of Classification Search
CPC ... H04L 5/0057; H04B 7/0617; H04B 7/0695; H04B 7/0486; H04B 7/0632; H04B 7/0452; H04B 7/0619; H04B 17/318
See application file for complete search history.

(56) References Cited

U.S. PATENT DOCUMENTS

| 2013/0329772 | A1* | 12/2013 | Wernersson | ......... H04B 7/0469 375/219 |
| 2018/0212651 | A1* | 7/2018 | Li | ........................ H04B 7/0695 |
| 2018/0212666 | A1* | 7/2018 | Kim | ........................ H04B 7/06 |

FOREIGN PATENT DOCUMENTS

| WO | 2015080645 A1 | 6/2015 |
| WO | 2017043883 A1 | 3/2017 |
| WO | 2017108132 A1 | 6/2017 |

OTHER PUBLICATIONS

Catt, "Beam Selection for CSI-RS beamforming", 3GPP TSG RAN WG1 Meeting #80bis, Belgrade, Serbia, Apr. 20, 2015, pp. 1-5, R1-151365, 3GPP.

(Continued)

*Primary Examiner* — Rahel Guarino
(74) *Attorney, Agent, or Firm* — Coats & Bennett, PLLC

(57) ABSTRACT

A method performed by a User Equipment (UE) is performed. The UE obtains (202) a beam reporting configuration. The beam reporting configuration defines a beam reporting procedure for determining an optimal beam for each of different sub-bands of a system bandwidth. The UE measures (204) different reference signals transmitted by the network node. The measured different reference signals correspond to each of the different sub-bands according to the beam reporting configuration. The UE then determines (206) a preferred beam for each of the different sub-bands based on the corresponding received reference signals.

24 Claims, 15 Drawing Sheets

(56) References Cited

OTHER PUBLICATIONS

Huawei, et al., "DL RS Design for NR Beam Management", 3GPP TSG RAN WG1 Meeting #87, Reno, NV, US, Nov. 14, 2016, pp. 1-5, R1-1611242, 3GPP.

3RD Generation Partnership Project, "3rd Generation Partnership Project; Technical Specification Group Radio Access Network; Study on channel model for frequencies from 0.5 to 100 GHz (Release 14)", Technical Report, 3GPP TR 38.901 V14.0.0, Mar. 1, 2017, pp. 1-88, 3GPP, France.

\* cited by examiner

200

```
┌─────────────────────────────────────────────┐
│ OBTAIN A BEAM REPORTING CONFIGURATION       │
│ DEFINING A BEAM REPORTING PROCEDURE FOR     │
│ DETERMINING AN OPTIMAL BEAM FOR EACH OF     │
│ DIFFERENT SUB-BANDS OF A SYSTEM BANDWIDTH   │
│ 202                                         │
└─────────────────────────────────────────────┘
                      │
                      ▼
┌─────────────────────────────────────────────┐
│ MEASURE, ACCORDING TO THE BEAM REPORTING    │
│ CONFIGURATION, DIFFERENT REFERENCE SIGNALS  │
│ TRANSMITTED BY THE NETWORK NODE             │
│ CORRESPONDING TO EACH OF THE DIFFERENT      │
│ SUB-BANDS                                   │
│ 204                                         │
└─────────────────────────────────────────────┘
                      │
                      ▼
┌─────────────────────────────────────────────┐
│ DETERMINE A PREFERRED BEAM FOR EACH OF THE  │
│ DIFFERENT SUB-BANDS BASED ON THE            │
│ CORRESPONDING RECEIVED REFERENCE SIGNALS    │
│ 206                                         │
└─────────────────────────────────────────────┘
```

Fig. 4A

UE, NETWORK NODE AND METHODS THEREIN FOR BEAM REPORTING IN A WIRELESS COMMUNICATION SYSTEM

TECHNICAL FIELD

Embodiments herein relate to a User Equipment (UE), a network node and methods therein. In some aspects, they relate to beam reporting procedure for determining an optimal beam for each of different sub-bands of a system bandwidth in a wireless communication system.

BACKGROUND

In a typical wireless communication network, User Equipments (UE), also known as wireless communication devices, mobile stations, stations (STA) and/or wireless devices, communicate via a Radio Access Network (RAN) and/or a Local Area Network such as a WiFi network or to one or more core networks (CN). The RAN covers a geographical area which is divided into service areas or cell areas, which may also be referred to as a beam or a beam group, with each service area or cell area being served by a radio network node such as a radio access node e.g., a Wi-Fi access point or a radio base station (RBS), which in some networks may also be denoted, for example, a NodeB, eNodeB (eNB), or gNB as denoted in 5th Generation (5G). A service area or cell area is a geographical area where radio coverage is provided by the radio network node. The radio network node communicates over an air interface operating on radio frequencies with the wireless device within range of the radio network node. The radio network node communicates to the wireless device in DownLink (DL) and from the wireless device in UpLink (UL).

Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network also referred to as 5G New Radio (NR). The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs used in 3rd Generation (3G) networks. In general, in E-UTRAN/LTE the functions of a 3G RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

Multi-antenna techniques may significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO.

In addition to faster peak Internet connection speeds, 5G planning aims at higher capacity than current 4G, allowing higher number of mobile broadband users per area unit, and allowing consumption of higher or unlimited data quantities in gigabyte per month and user. This would make it feasible for a large portion of the population to stream high-definition media many hours per day with their mobile devices, when out of reach of Wi-Fi hotspots. 5G research and development also aims at improved support of machine to machine communication, also known as the Internet of things, aiming at lower cost, lower battery consumption and lower latency than 4G equipment.

In addition to faster peak Internet connection speeds, 5G planning aims at higher capacity than current 4G, allowing higher number of mobile broadband users per area unit, and allowing consumption of higher or unlimited data quantities in gigabyte per month and user. This would make it feasible for a large portion of the population to stream high-definition media many hours per day with their UEs, when out of reach of Wi-Fi hotspots. 5G research and development also aims at improved support of machine to machine communication, also known as the Internet of things, aiming at lower cost, lower battery consumption and lower latency than 4G equipment.

For a given communication link, a beam may be applied at both a Transmit Receive Point (TRP) and a UE. This TRP-UE may be referred to as a Beam Pair Link (BPL). Due to frequency selectivity in a channel, the optimal TRP Transmit (TX) beam may be different for different parts of the system frequency band. Hence, depending on in which frequency sub-band the UE is scheduled in, different TRP TX beams may be optimal relative to others.

In current beam management techniques, a UE transmits only one Channel State Information Reference Signal (CSI-RS) Resource Indicator (CRI) report to the TRP, e.g. network node, for the entire bandwidth. Hence, the TRP is unable to determine which TRP TX beam is optimal for a particular sub-band of the greater system bandwidth.

SUMMARY

Since the TRP is unable to determine which TRP TX beam that is optimal for a particular sub-band of the greater system bandwidth, it is not possible for the TRP to combine frequency selective scheduling with TX beam selection in an optimal manner. Accordingly, techniques for sub-link-specific beam selection are needed.

An object of embodiments herein is to improve the performance in a wireless communications network using sub-link-specific beam selection.

According to an aspect of embodiments herein, the object is achieved by a method performed by a User Equipment, UE. The UE obtains 0 a beam reporting configuration. The beam reporting configuration defines a beam reporting procedure for determining an optimal beam for each of different sub-bands of a system bandwidth. The UE measures 0 different reference signals transmitted by the network node. The measuring corresponds to each of the different sub-bands according to the beam reporting configuration. The UE then determines 0 a preferred beam for each of the different sub-bands based on the corresponding received reference signals.

According to another aspect of embodiments herein, the object is achieved by a User Equipment, UE, comprising one or more processing circuits and at least one memory. The one or more processing circuits are configured to execute at least one instruction stored on the at least one memory such that the UE is configured to: Obtain a beam reporting configuration defining a beam reporting procedure for determining an optimal beam for each of different sub-bands of a system bandwidth; measure, according to the beam reporting configuration, different reference signals transmitted by the network node corresponding to each of the different sub-bands; and determine a preferred beam for each of the different sub-bands based on the corresponding received reference signals.

According to another aspect of embodiments herein, the object is achieved by a User Equipment, UE, device configured to: Obtain a beam reporting configuration defining a beam reporting procedure for determining an optimal beam for each of different sub-bands of a system bandwidth; measure, according to the beam reporting configuration, different reference signals transmitted by the network node corresponding to each of the different sub-bands; and determine a preferred beam for each of the different sub-bands based on the corresponding received reference signals.

According to another aspect of embodiments herein, the object is achieved by a method performed by a network node. The network node determines a beam reporting configuration. The beam reporting configuration defines a beam reporting procedure to be utilized by a User Equipment, UE, for determining an optimal beam for each of different sub-bands of a system bandwidth. The network node signals the beam reporting configuration to the UE. The network node transmits different reference signals to the UE according to the beam reporting configuration. The different reference signals correspond to each of the different sub-bands. The network node then receives a beam reporting message from the UE. The beam reporting message indicates a preferred beam for each of the different sub-bands.

According to another aspect of embodiments herein, the object is achieved by a network node comprising one or more processing circuits and at least one memory. The one or more processing circuits are configured to execute at least one instruction stored on the at least one memory such that the network node is configured to:

Determine a beam reporting configuration defining a beam reporting procedure to be utilized by a user equipment (UE) for determining an optimal beam for each of different sub-bands of a system bandwidth; signal the beam reporting configuration to the UE; transmit different reference signals to the UE according to the beam reporting configuration, the different reference signals corresponding to each of the different sub-bands; and receive a beam reporting message from the UE, the beam reporting message indicating a preferred beam for each of the different sub-bands.

According to another aspect of embodiments herein, the object is achieved by a network node configured to: Determine a beam reporting configuration defining a beam reporting procedure to be utilized by a user equipment (UE) for determining an optimal beam for each of different sub-bands of a system bandwidth; signal the beam reporting configuration to the UE; transmit different reference signals to the UE according to the beam reporting configuration, the different reference signals corresponding to each of the different sub-bands; and receive a beam reporting message from the UE, the beam reporting message indicating a preferred beam for each of the different sub-bands.

An advantage of embodiments herein is the network node can perform better frequency selective scheduling to enhance coverage and capacity.

BRIEF DESCRIPTION OF THE FIGURES

FIG. 4A is a flow chart illustrating a method performed by a UE according to one or more embodiments.

DETAILED DESCRIPTION

As part of developing embodiments herein, the inventors have identified some problems which first will be discussed.

As wireless network technology continues to advance, narrow beam transmission and reception schemes will be needed at higher frequencies to compensate the high propagation loss. For a given communication link, a beam may be applied at both a TRP and a UE. The TRP-UE pair may be referred to as a BPL throughout the present disclosure. A task of the beam management procedure is to discover and maintain beam pair links between a network node such as a TRP and a UE.

Figure 1:
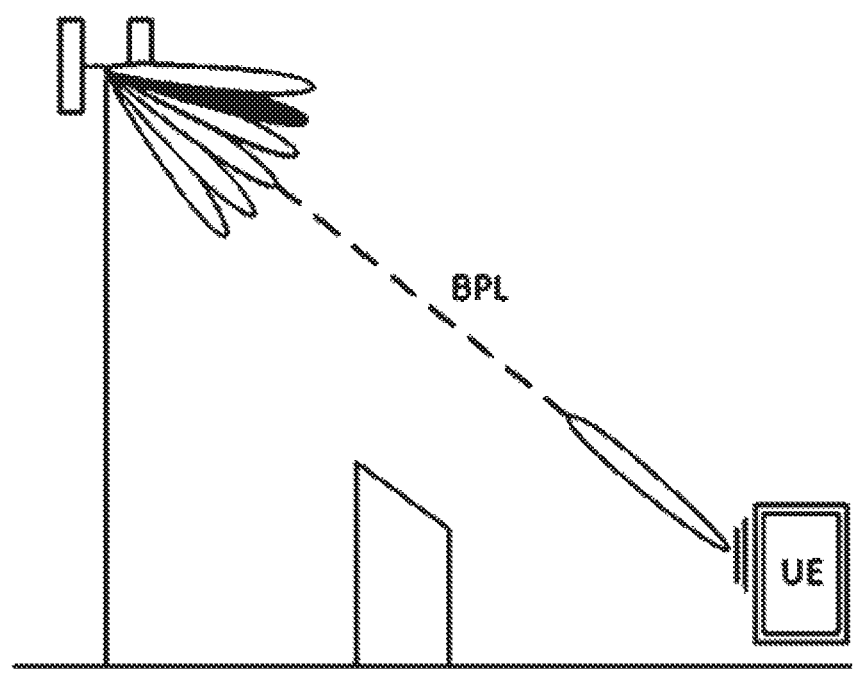
FIG. 1 is a block diagram illustrating a wireless communication system of prior art.

In an example of FIG. 1, one BPL has been discovered and is being maintained by a network such as a wireless communication network. A BPL, i.e., both the TRP beam and UE beam, is expected to be discovered and monitored by the network such as the TRP, using measurements on downlink reference signals used for beam management such as e.g., CSI-RS, which has been agreed in standards documents from the 3GPP as beam reference signal for NR. The CSI-RS for beam management may be transmitted periodically, semi-persistently, or aperiodic, event triggered, and they may be either shared between multiple UEs or may be UE-specific. In order to find a suitable TRP beam the TRP transmits CSI-RS in different TRP TX beams on which the UE performs Reference Signal Received Power (RSRP) measurements and reports back the N best TRP TX beams, where N may be configured by the network. This may be done by reporting a so called CSI-RS Resource Indicator (CRI) which is a reference to the CSI-RS transmission with the best TRP TX beam. Furthermore, the CSI-RS transmission on a given TRP beam may be repeated to allow the UE to evaluate a suitable UE beam. For each BPL, the UE remembers the best UE RX beam, and whenever the TRP transmits signals in a given BPL, the UE applies the corresponding UE RX beam.

Currently, three main implementations of beamforming exist and are implemented both at the TRP and at the UE: Analog beamforming, digital beamforming, and hybrid beamforming. Digital beamforming is the most flexible solution but also the costliest due to the large number of required radios and baseband chains. Analog beamforming is the least flexible but cheaper to manufacture due to reduced number of radio and baseband chains. Hybrid beamforming is a compromise between the analog and digital beamforming.

One type of beamforming antenna architecture that has been agreed to study in 3GPP for the NR access technology is the concept of antenna panels, both at the TRP and at the UE. A panel is an antenna array of dual-polarized elements with typically one Transmit and/or Receive Unit (TXRU) per polarization. An analog distribution network with phase shifters is used to steer the beam of each panel.

Figure 2:
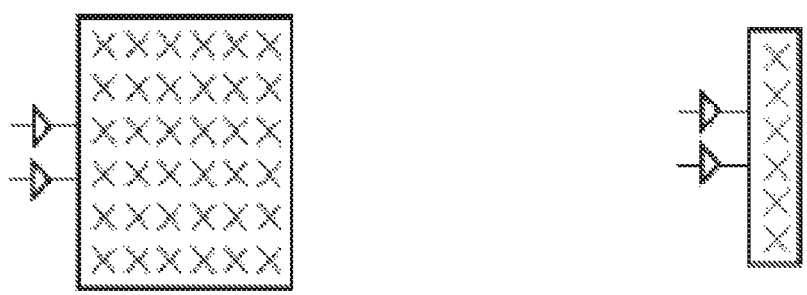
FIG. 2 is a block diagram illustrating examples of antenna panels of prior art.

FIG. 2 illustrates two examples of panels, two-dimensional panels to the left and one-dimensional panels to the right, where each panel is connected to one TXRU per polarization.

It is expected that a phase and amplitude is known for each element within an analog array for both TX and RX, i.e. an analog array may be assumed to be calibrated. Hence, reciprocity may be used to find a good RX beam in case a good TX beam has been found, and vice versa.

The CSI-RSs for beam management are expected to cover the whole bandwidth in order to get a wideband sounding of the channel. Currently, only one CRI per TRP TX beam has been discussed for future implementation in 3GPP standards, i.e. for 5G technologies also referred to as NR technologies. Therefore, CRI is presently the indicator for which TRP TX beam is best on average over the entire system bandwidth.

Furthermore, in 5G, the available bandwidth at millimeter-wave (mmw) frequencies will be very large in order to facilitate thigh data rates required by modern wireless devices, many of which may be connected to a 5G network at a given time, around 29 billion connected devices are forecast by 2022, of which around 18 billion will be related to the Internet of Things (IoT). Many of these devices will have a low data demand and only transmit/receive small packets, in particular, IoT devices. For several application categories, e.g., web surfing and social networking, this also holds for more data hungry devices, such as smart phones and tablets. It is expected that web browsing will constitute 22% of the mobile traffic and social networking 38% in the coming years.

Hence, it is reasonable to expect that a large number of UEs will not need the entire system bandwidth all the time. It may also be beneficial from a link-budget point of view to utilize only a part of the system bandwidth in order to increase the power spectral density. This is of particular importance at mmw frequencies due to the associated high propagation loss. Hence, it is reasonable to expect that in many cases the system bandwidth will be shared among several UEs. Therefore, in order to fully utilize the available system bandwidth at mmw frequencies, frequency-dependent scheduling will be needed.

Due to frequency selectivity in the channel the optimal TRP TX beam may be different for different parts of the frequency band. Hence, depending on in which frequency sub-band the UE is scheduled in, different TRP TX beams may be optimal. In current concepts for beam management only one CRI report for the entire bandwidth is transmitted. Thus, the TRP has no knowledge about which TRP TX beam is optimal for a particular sub-band. Therefore, it is not possible for the TRP to combine frequency selective scheduling with TX beam selection in an optimal manner.

According to the example embodiments described in the present disclosure, the UE measures and reports preferred TRP beam(s) for each sub-band of a system bandwidth through frequency-selective CRI reporting. In some examples, the UE also reports RSRP for the best beam(s) per sub-band. The beam reporting configuration includes instructions for the UE regarding how it should divide the system bandwidth, reference signal timing, what should be included in a beam report that the UE transmits to the TRP after measuring and processing the reference signals for each sub-band, and the like. In an aspect, this UE reporting is configured by the TRP by transmitting information about frequency granularity, number of beams, and RSRP reporting. In some examples, configuration settings may be signaled through RRC and then the beam reporting process associated with the configuration may be triggered in DCI or MAC-CE. As CRI transmission is not required frequently and does not require many bits, the increase in reporting overhead according to embodiments herein is small compared to other signaling. Since the UE in some embodiments report frequency selective CRI for the same UE RX beam, no TX beam indication is required and there is no significant impact on DCI.

Using the techniques presented herein, the TRP, also referred to herein as a network node, such as network node 106 introduced in FIG. 1, gets more degrees of freedom in frequency-dependent UE scheduling. In addition, the network nodes may make better choices of TX beams for the scheduled UEs. These features may help increase the capacity of the network as a whole.

Figure 3:
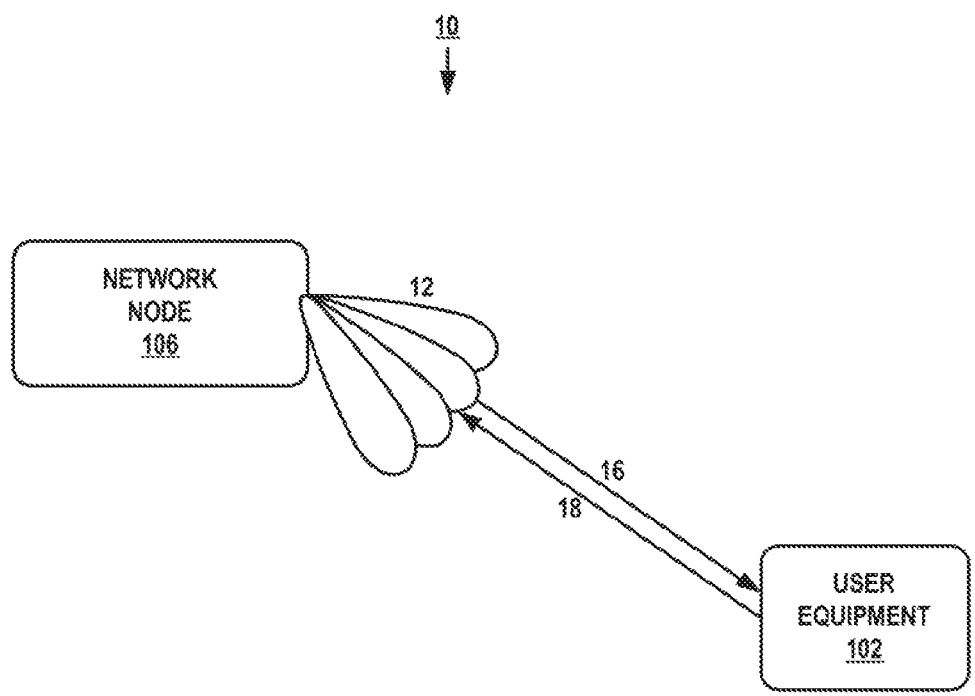
FIG. 3 is a block diagram illustrating a wireless communication system corresponding to example embodiments of the present disclosure.

FIG. 3 illustrates a wireless communication environment 10 such as a wireless communication network, that includes a TRP in the form of a network node 106 and a UE 102, which communicate wirelessly via one or more different beams 12. In an aspect, any one or more of these beams may be preferred in relation to the others in each of two or more sub-bands within a system bandwidth, i.e. the bandwidth available for communication between the network node 106 and UE 102 in system 10. A preferred beam or beams for each sub-band may be determined by UE 102 after monitoring the sub-bands for reference signals 16 transmitted by the network node 106 in each sub-band. After the preferred beam(s) are determined, the UE 102 may report the preferred beam(s) to the network node 106 in a beam reporting message 18.

This beam reporting process may be configured by the network node 106. In particular, the network node 106 may be configured to determine a beam reporting configuration according to which the UE 102 may measure and process sub-band-specific reference signals 16 transmitted by the network node 106. Through this process, the network node 106 may receive sub-band-specific preferred beam information, e.g. in the beam reporting message 18, which allows the network node 106 to schedule time-frequency resources such that performance of the system as a whole is increased. Further details regarding these aspects is presented in relation to the figures below.

FIG. 4A illustrates an exemplary method 200 performed by a UE 102 according to the present disclosure. For instance, method 200 may include, at block 202, obtaining a beam reporting configuration defining a beam reporting procedure for determining an optimal beam for each of different sub-bands of a system bandwidth. Method 200 may also include, at block 204, measuring, according to the beam reporting configuration, different reference signals transmitted by the network node corresponding to each of the different sub-bands. It should be noted that one reference signal may e.g. be use for the whole bandwidth, but different reference signals for the different beams. Then the UE 120 may use part of the reference signal, i.e. a sub-set of all sub-carriers, to measure received power for a certain frequency band.

Moreover, method 200 may include, at block 206, determining a preferred beam for each of the different sub-bands based on the corresponding received reference signals.

In addition, though not explicitly shown in FIG. 4A, method 200 may include one or more additional or alternative embodiments, which follow. For instance, method 200 may further include receiving a triggering signal for starting the beam reporting procedure at the UE 102, and the triggering signal may be based on a data requirement of the UE 102 and/or an available portion of the system bandwidth. In some examples, the triggering signal is transmitted to the UE 102 in Downlink Control Information (DCI). The trigger signal may be a Medium Access Control (MAC)-Control Element (CE) message.

In some instances, the beam reporting configuration of method 200 is signaled to the UE 102 via Radio Resource Control (RRC) signaling. Furthermore, the beam reporting configuration may include one or more parameters corresponding to one or more of frequency granularity of the different sub-bands, a number of beams usable by the network node, and Reference Signal Received Power (RSRP) reporting. Additionally, method 200 may also include transmitting a beam reporting message to the network node, where the beam reporting message indicates the preferred beam for each of the different sub-bands. In some example embodiments, the beam reporting message further indicates a wideband preferred beam for the system bandwidth as a whole. Furthermore, the different reference signals may be different CSI-RSs.

Figure 4B:
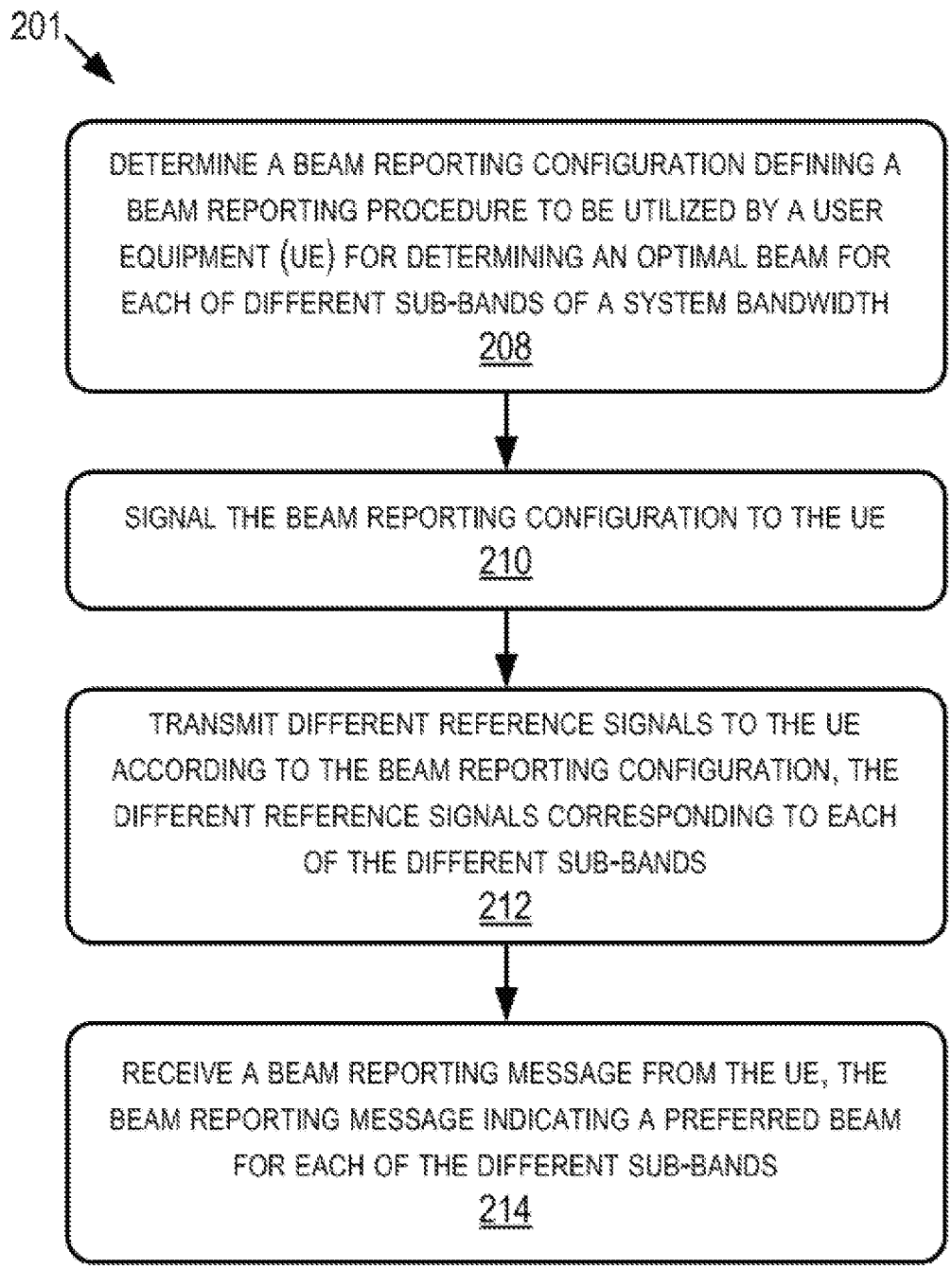
FIG. 4B is a flow chart illustrating a method performed by a network node according to one or more embodiments.

FIG. 4B illustrates an exemplary method 201 performed by a network node 106 according to the present disclosure.

For instance, method 201 may include, at block 208, determining a beam reporting configuration defining a beam reporting procedure to be utilized by a user equipment (UE) for determining an optimal beam for each of different sub-bands of a system bandwidth. As mentioned above, one reference signal may e.g. be use for the whole bandwidth, but different reference signals for the different beams. Then the UE 120 may use part of the reference signal, i.e. a sub-set of all sub-carriers, to measure received power for a certain frequency band.

In addition, method 201 may include at block 210, signaling the beam reporting configuration to the UE 102 and at block 212, transmitting different reference signals to the UE 102 according to the beam reporting configuration, where the different reference signals correspond to each of the different sub-bands.

Furthermore, method 201 may include, at block 214, receiving a beam reporting message from the UE 102, the beam reporting message indicating a preferred beam for each of the different sub-bands.

In addition, though not explicitly shown in FIG. 4B, method 201 may include one or more additional or alternative embodiments, which follow. For instance, method 201 may include transmitting, to the UE 102, a triggering signal for initializing the beam reporting procedure at the UE 102, and the triggering signal may be transmitted in DCI. Likewise, in some instances, the beam reporting configuration is signaled to the UE 102 via RRC signaling. In addition, in some examples, the beam reporting configuration of method 201 may include one or more parameters corresponding to one or more of frequency granularity of the different sub-bands, a number of beams usable by the network node, and indicating whether a beam reporting message transmitted by the UE 102 to the network node 106 should include one or more RSRP values and/or one or more Channel Quality Indicator (CQI) values resulting from the UE measurement of the reference signals in each sub-band.

Furthermore, in some examples, the different reference signals may be different CSI-RSs. Additionally, determining the beam reporting configuration may include, in some examples, estimating frequency selectivity associated with the system bandwidth and determining a frequency granularity defining the sub-bands within the system bandwidth based on the estimated frequency selectivity. Estimating the frequency selectivity may include obtaining a measured coherence bandwidth and/or reciprocal of delay spread in some examples. Also, in some embodiments, the frequency granularity defining the sub-bands may be UE-specific, cell-specific, or common for a group of UEs with similar channel properties.

Figure 5:
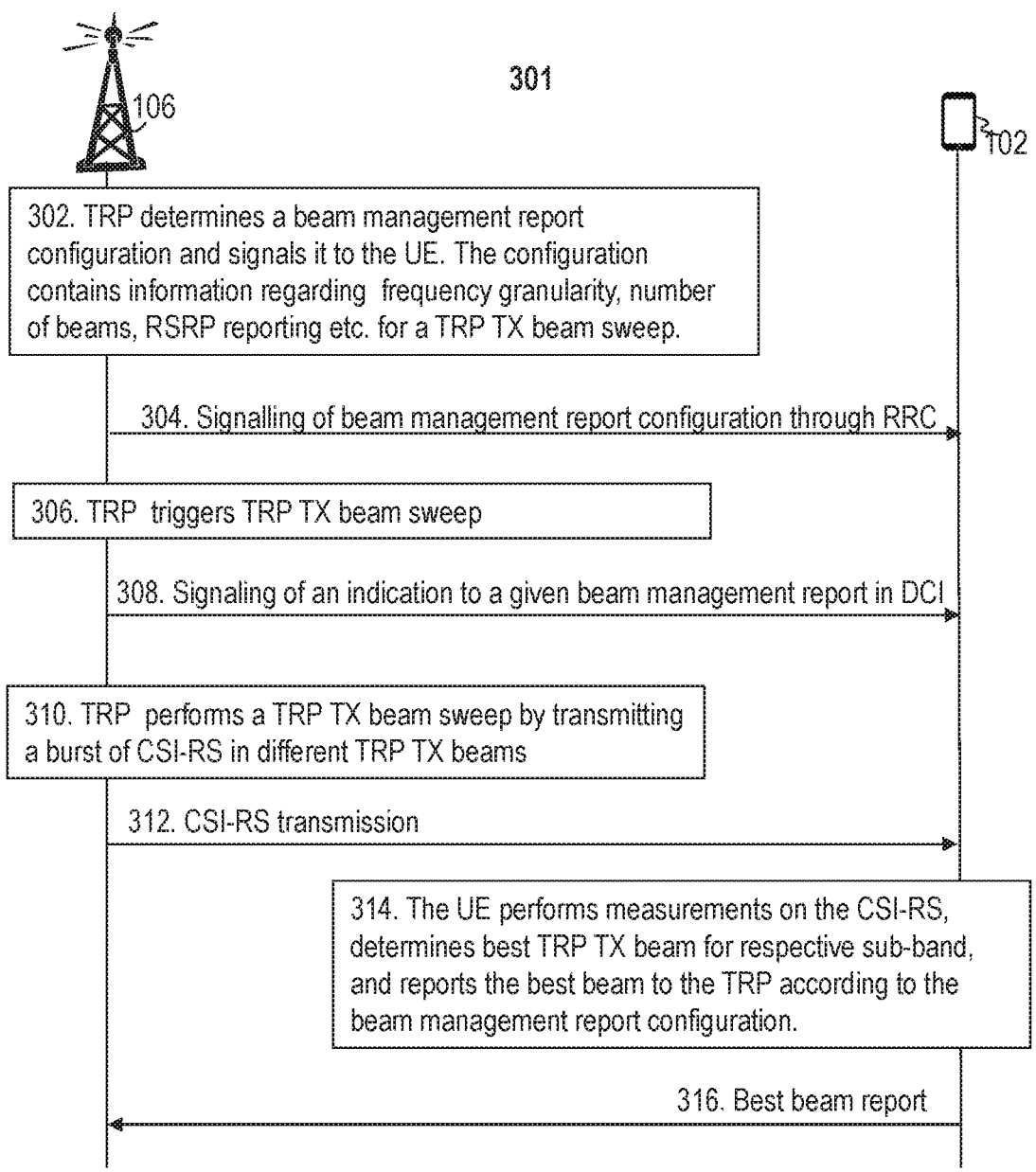
FIG. 5 is a signaling and method diagram illustrating embodiments of a method.

FIG. 5 is a signaling and method diagram illustrating an exemplary method 301 of aspects of the present disclosure. In particular the diagram illustrates functions performed by the network node 106, also referred to as the TRP 106 and functions performed by a transmitting device 102 also referred to as the UE 102 according to the present disclosure.

For instance, as shown, the network node 106 may at block 302, determine a beam management report configuration, also referred to herein as a beam reporting configuration.

Once this has been determined, the network node 106 may at 304 signal the beam management/reporting configuration to the UE 102, for instance, via RRC signaling.

Thereafter, the network node 106 may at block 306 trigger a TRP TX beam sweep.

After this triggering, the network node 106 may transmit 308, an indication to the UE 102 that the beam management/reporting configuration is to be initiated.

The network node 106 may at block 310 perform the TRP TX beam sweep.

The TRP TX beam sweep 310 may involve transmitting 312 a burst of different reference signals, e.g. the CSI-RS transmissions, in different sub-bands according to the beam management/reporting configuration determined at block 302.

During this beam sweep, the UE performs 314 measurements on the reference signals in the different sub-bands, and based on the measurements, determines a preferred, or "best" beam for each sub-band.

The UE 102 may then inform 316 the network node 106 of the determined best beam for each sub-band in a reporting message, e.g. best beam report.

According to an example, in the first step 302 the TRP 106 determines a beam management report configuration containing information about future TRP TX beam sweeps and signals 304 it to the UE 102 over higher layers, for example through RRC. The configuration may comprise frequency granularity, i.e. the size of the subband that the UE 102 should report best TRP TX beam for, number of TRP TX beams, if RSRP should be reported etc. The TRP 106 then triggers 306 a TRP TX beam sweep procedure by pointing in DCI to the already signaled beam management report configuration. Next the TRP 106 performs 310 the TRP TX beam sweep by transmitting 312 different CSI-RS in different TRP TX beams. Meanwhile the UE 102 performs 314 measurements on the CSI-RS and determines the best beam per subband. The UE 102 then signals 316 a best beam report containing the best beam per subband and possibly also RSRP values. It is also possible to use other metrics instead of RSRP, for example CQI.

In some embodiments, the UE 102 reports both frequency selective CRI/RSRP and wideband CRI/RSRP so that the TRP 106 has the option to choose between wideband or sub-band TX beam selection.

In some embodiments, the triggering of a frequency selective CRI report is determined based on the data requirement of the UE 102 and the available bandwidth. In some embodiments, the frequency granularity of the CRI reporting is determined based on an estimate of frequency selectivity of the channel. Such an estimate may be, e.g., a measured coherence bandwidth or reciprocal of delay spread. The frequency granularity of the CRI reporting may be UE-specific, cell-specific or common for a group of UEs with similar channel properties.

The UE 102 may e.g. measure and report best TRP beam(s) per sub-band through frequency-selective CRI reporting. Optionally, it also reports RSRP for the best beam(s) per sub-band. The reporting is configured by the TRP 106 by transmitting information about frequency granularity, number of beams, and RSRP reporting. For example, configuration settings may be signaled through RRC and triggered in DCI.

Figure 6:
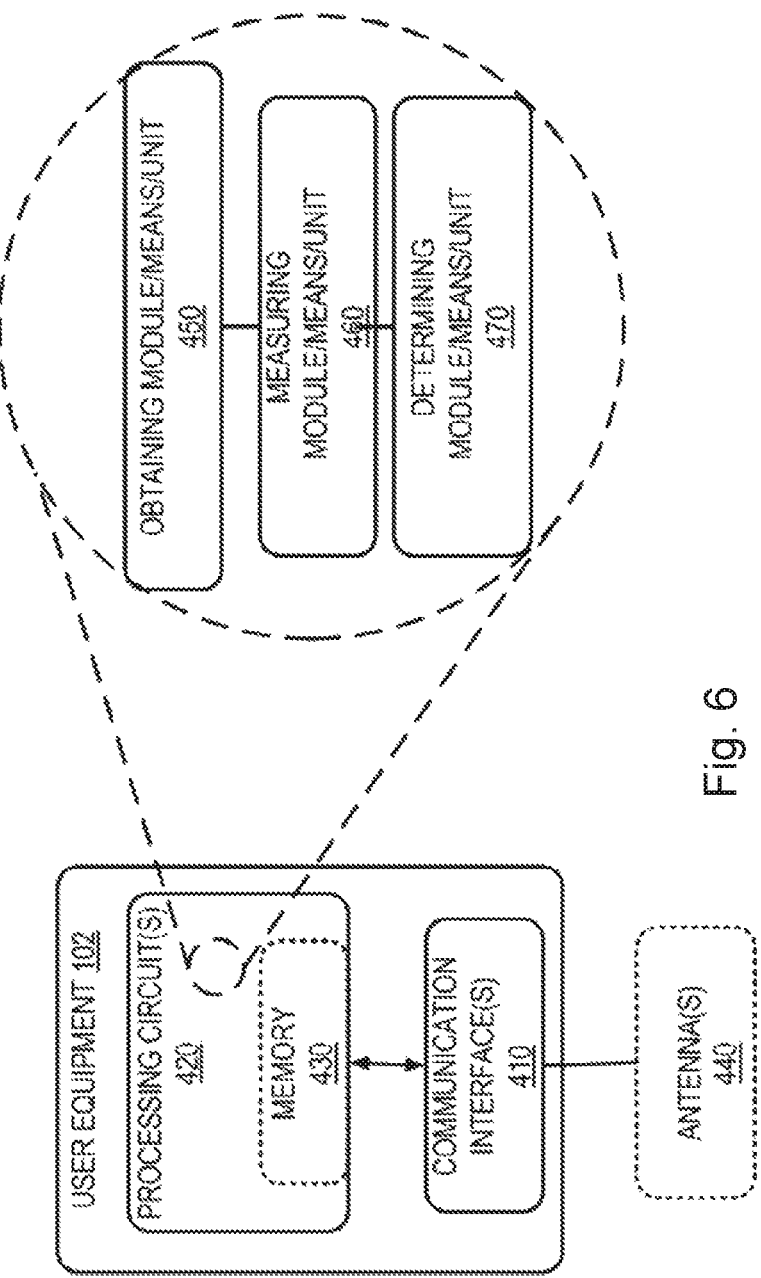
FIG. 6 is a block diagram illustrating details of an example UE according to one or more embodiments.

FIG. 6 illustrates additional details of an example of the UE 102 according to one or more embodiments. The UE 102 is configured, e.g., via functional means or units 450, 460, and 470, to implement processing to perform the aspects described above. In at least some embodiments, the UE 102 comprises one or more processing circuits 420 configured to implement processing of method 200 and 301, such as by implementing functional means or units. In one embodiment, for example, the processing circuit(s) 420 implements functional means or units as respective circuits. The circuits in this regard may comprise circuits dedicated to performing certain functional processing and/or one or more microprocessors in conjunction with a memory 430. In embodiments that employ memory 430, which may comprise one or several types of memory such as Read-Only Memory (ROM), random-access memory, cache memory, flash memory devices, optical storage devices, etc., the memory 430 stores program code that, when executed by the one or more for carrying out one or more microprocessors, carries out the techniques described herein.

In one or more embodiments, the UE 102 also comprises one or more communication interfaces 410. The one or more communication interfaces 410 may include various components, e.g., antennas 440, for sending and receiving data and control signals. More particularly, the interface(s) 410 include a transmitter that is configured to use known signal processing techniques, typically according to one or more standards, and is configured to condition a signal for transmission, e.g., over the air via one or more antennas 440. Similarly, the interface(s) include a receiver that is configured to convert signals received, e.g., via the antenna(s) 440, into digital samples for processing by the one or more processing circuits. The transmitter and/or receiver may also include one or more antennas 440.

Furthermore, as shown in FIG. 6, the UE 102 may include an obtaining module/means/unit 450 for obtaining a beam reporting configuration defining a beam reporting procedure for determining an optimal beam for each of different sub-bands of a system bandwidth; a measuring module/means/unit 460 for measuring, according to the beam reporting configuration, different reference signals transmitted by the network node 106 corresponding to each of the different sub-bands; and/or a determining module/means/unit 470 for determining a preferred beam for each of the different sub-bands based on the corresponding received reference signals, and/or one or more further modules/means/units not explicitly shown, that are configured, individually or collectively, to perform aspects of method 200, or techniques described anywhere in the present disclosure, to carry out such techniques in the UE 102.

Figure 7:
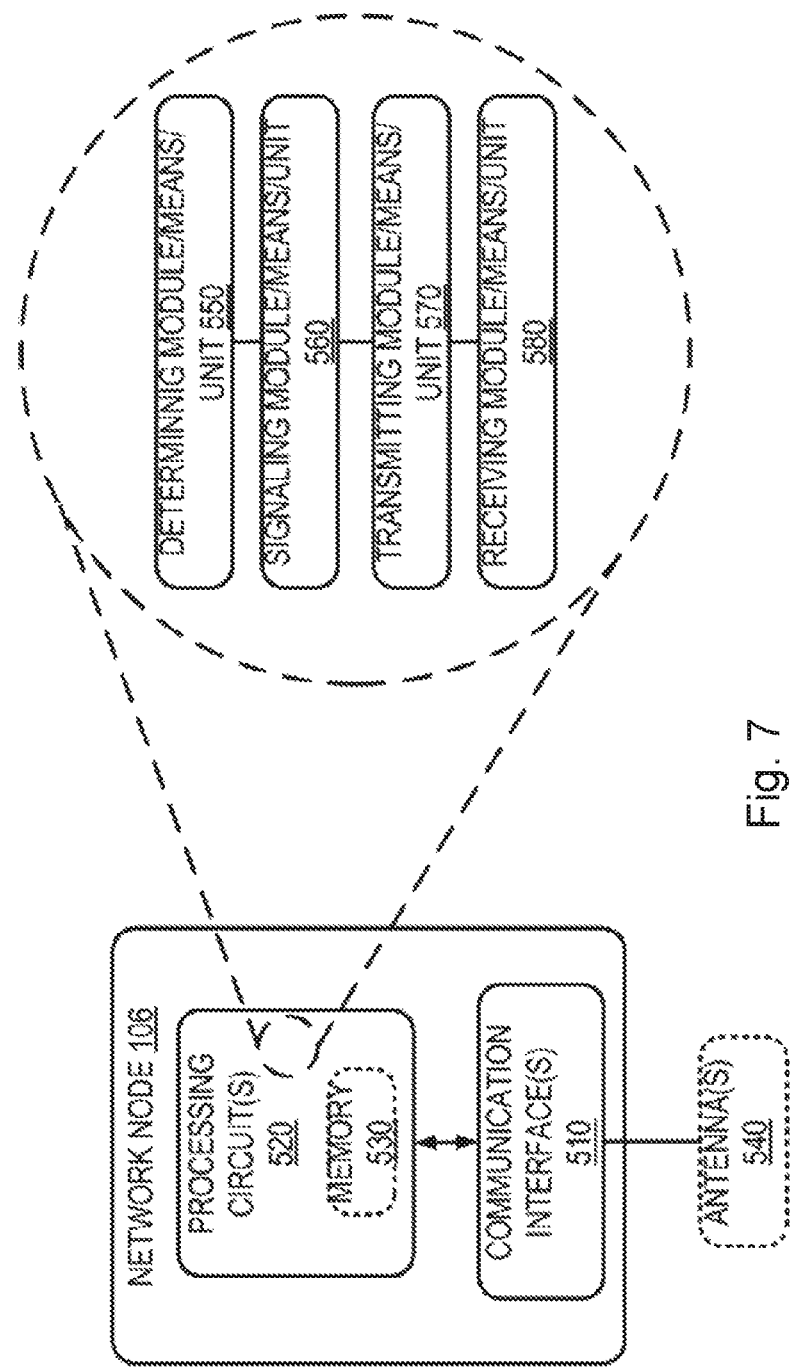
FIG. 7 is a block diagram illustrating details of an example network node according to one or more embodiments.

FIG. 7 illustrates additional details of an example network node 106 according to one or more embodiments. The network node 106 is configured, e.g., via functional means or units 550, 560, 570, and/or 580, to implement processing to perform the aspects described above.

In at least some embodiments, the network node 106 comprises one or more processing circuits 520 configured to implement processing of the methods 201 and 301 of FIGS. 4B and 5, such as by implementing functional means or units above. In one embodiment, for example, the processing circuit(s) 520 implements functional means or units as respective circuits. The circuits in this regard may comprise circuits dedicated to performing certain functional processing and/or one or more microprocessors in conjunction with memory 530. In embodiments that employ memory 530, which may comprise one or several types of memory such as ROM, random-access memory, cache memory, flash memory devices, optical storage devices, etc., the memory 530 stores program code that, when executed by the one or more for carrying out one or more microprocessors, carries out the techniques described herein.

In one or more embodiments, the network node 106 also comprises one or more communication interfaces 510. The one or more communication interfaces 510 include various components, e.g., antennas 540, for sending and receiving data and control signals. More particularly, the interface(s) 510 include a transmitter that is configured to use known signal processing techniques, typically according to one or more standards, and is configured to condition a signal for transmission, e.g., over the air via one or more antennas 540. Similarly, the interface(s) include a receiver that is configured to convert signals received, e.g., via the antenna(s) 540, into digital samples for processing by the one or more processing circuits. The transmitter and/or receiver may also include one or more antennas 540. By utilizing the communication interface(s) 510 and/or antenna(s) 540, the network node 106 is able to communicate with other devices to transmit QoS data flows as well as manage the mapping of these flows to radio bearers, remap the flows to different bearers, and/or remove the flows entirely.

Furthermore, as shown in FIG. 7, network node 106 may include a determining module/means/unit 550 for determining a beam reporting configuration defining a beam reporting procedure to be utilized by the UE 102 for determining an optimal beam for each of different sub-bands of a system bandwidth; a signaling module/means/unit 560 for signaling the beam reporting configuration to the UE; a transmitting module/means/unit 570 for transmitting different reference signals to the UE according to the beam reporting configuration, and/or a receiving module/means/unit 580 for receiving a beam reporting message from the UE, the beam reporting message indicating a preferred beam for each of the different sub-bands, and/or one or more further modules/means/units not explicitly shown, that are configured, individually or collectively, to perform aspects of method 201, or techniques described anywhere in the present disclosure, to carry out such techniques in network node 106.

Those skilled in the art will also appreciate that embodiments herein further include corresponding computer programs, A computer program comprises instructions which, when executed on at least one processor of the network node 106 or UE 102, or UE or network node, cause these devices to carry out any of the respective processing described above. Furthermore, the processing or functionality may be considered as being performed by a single instance or device or may be divided across a plurality of instances devices 102/106 that may be present in a given wireless system such that together the device instances perform all disclosed functionality, Embodiments further include a carrier containing such a computer program. This carrier may comprise one of an electronic signal, optical signal, radio signal, or computer readable storage medium. A computer program in this regard may comprise one or more code modules corresponding to the means or units described above.

A network node herein is any type of network node (e.g., a base station) capable of communicating with another node over radio signals. A UE is any type device capable of communicating with a network node 106 over radio signals, such as, but not limited to, a device capable of performing autonomous wireless communication with one or more other devices, including a machine-to-machine (M2M) device, a machine-type communications (MTC) device, a user equipment (UE), however it should be noted that the UE does not necessarily have a "user" in the sense of an individual person owning and/or operating the device. A UE such as the UE 102 may also be referred to as a radio device, a radio communication device, a wireless terminal, or simply a terminal—unless the context indicates otherwise, the use of any of these terms is intended to include device-to-device UEs or devices, machine-type devices or devices capable of machine-to-machine communication, sensors equipped with a wireless device, wireless-enabled table computers, mobile terminals, smart phones, laptop-embedded equipped (LEE), laptop-mounted equipment (LME), USB dongles, wireless customer-premises equipment (CPE), etc. In the discussion herein, the terms machine-to-machine (M2M) device, machine-type communication (MTC) device, wireless sensor, and sensor may also be used. It should be understood that these devices may be UEs, but are generally configured to transmit and/or receive data without direct human interaction.

The present embodiments may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

Embodiments herein will now be described in more detail by means of a simulation example.

Figure 8A:
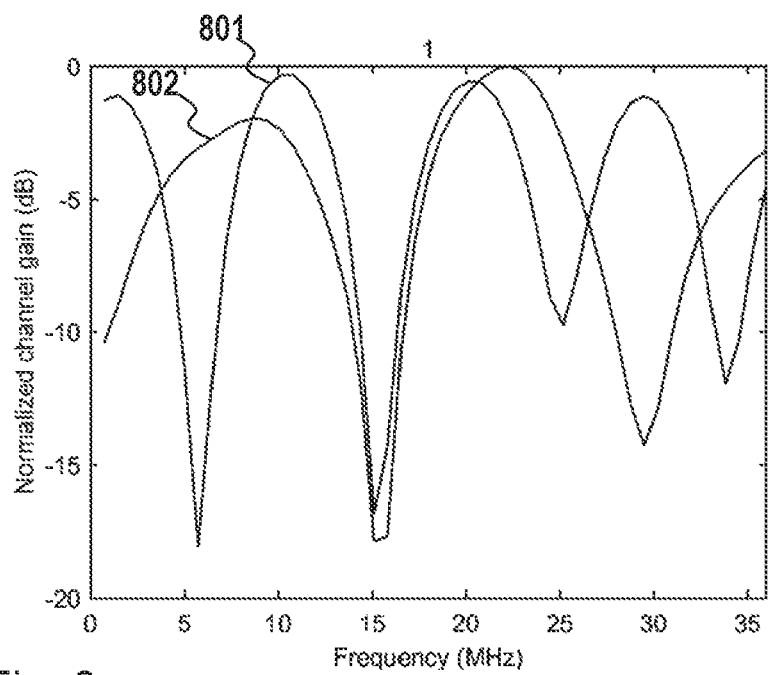
FIGS. 8a-d are diagrams showing examples of frequency response according embodiments herein.

FIGS. 8a, b, c, and d illustrates Channel realizations for Non-Line-of-Sight (NLoS) channels using the 5G UMa channel model depicting examples of frequency responses for four different channel realizations of a 3GPP 5G Urban Macro (Uma) channel model at 30 GHz carrier frequency. An UMa channel is a channel that models an urban macro scenario using statistically created clusters of rays and their corresponding path gains. The channel is calculated for 50 resource blocks, where each resource block has 720 kHz bandwidth. Hence, the total bandwidth is 36 MHz corresponding to a 40 MHz carder with 10% guard band. The TRP antenna has one panel with 4×8 antenna elements and the UE antenna has two panels oriented back-to-back with 2×4 antenna elements each. Analog beams are generated from a DFT grid-of-beams, Butler matrix, in both the TRP such as the network node 106 and a UE such as the UE 102, and the channel gain is calculated for each combination of a TRP beam and a UE beam, here referred to as a beam pair. The channel gain, gk, for resource block k for a particular beam pair is calculated according to $$g_k |w_{UE}^H H_k w_{TRP}|^2$$

where wUU and wTTT are the beamforming weight vectors for the UE and TRP beams in the beam pair, Hk is the NUU×NTTT channel matrix at resource block k, where NUU and NTTT is the number of UE and TRP antenna elements, respectively.

The average channel gain over the total bandwidth is calculated as:

$$\bar{g} = \frac{1}{K}\sum_{k=1}^{K} g_k,$$

where K is the number of resource blocks in the bandwidth.

Figure 8B:
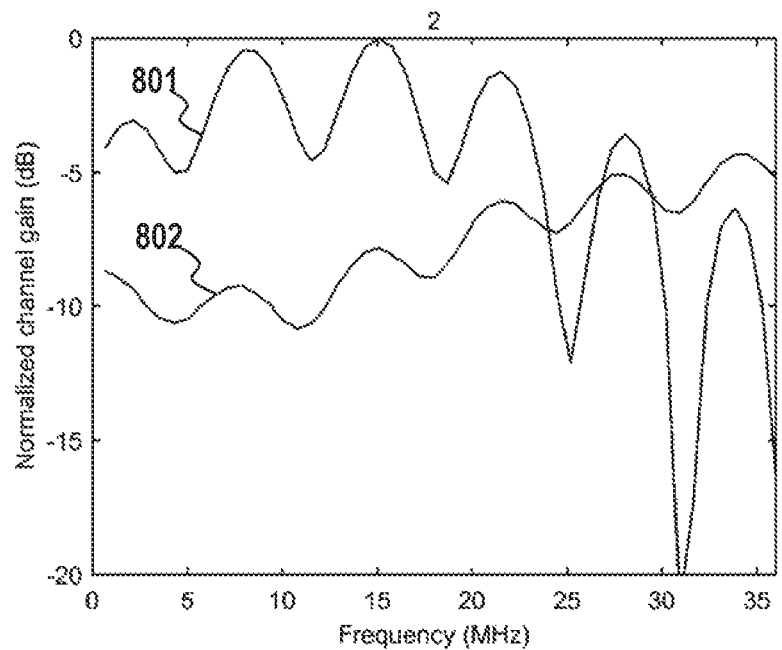
Figure 8C:
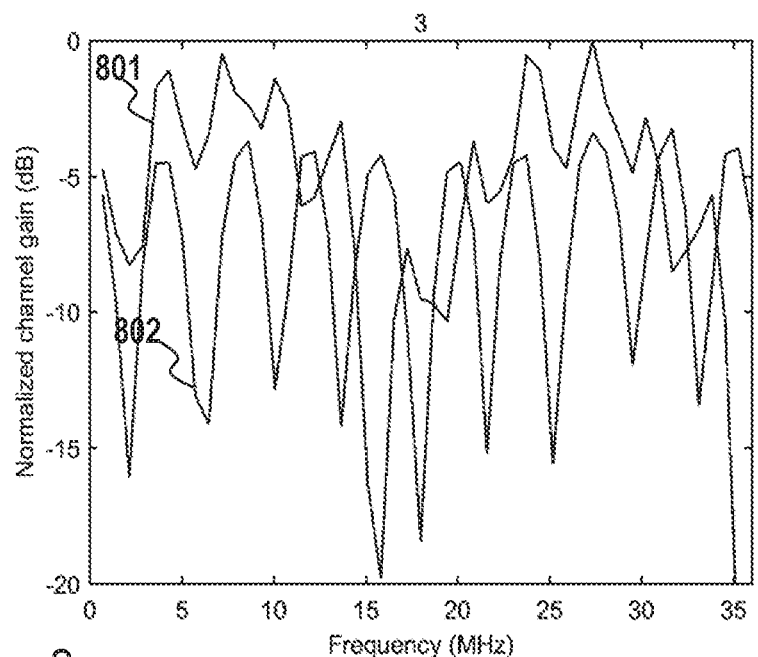
Figure 8D:
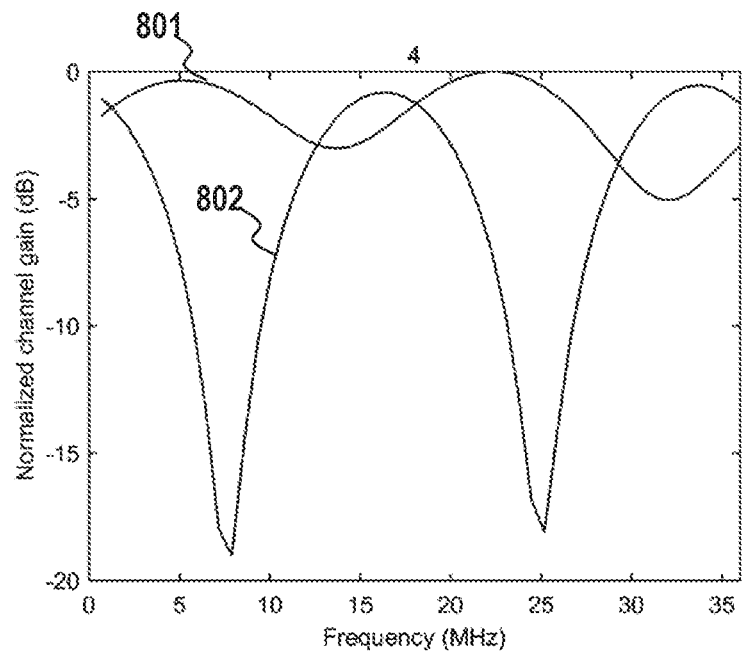

Each plot in FIGS. 8a, b, c, and d shows normalized channel gain for two different beam pairs for 50 resource blocks. The curves 801 are for the beam pair that has the highest average channel gain, $\bar{g}$. This is the beam pair that would be selected for data transmission in a prior art beam management procedure. This is a reasonable choice if the UE 102 is scheduled the entire bandwidth. The curves 802 show the frequency response of another beam pair that has the same UE RX beam as the blue beam pair but a different TRP TX beam, and where this beam pair has a higher channel gain in a part of the band. For example, in plot number 1 shown in FIG. 8a, the beam pair 802 has significantly higher gain than the beam pair 801 in the sub-bands [4 8] MHz, [21 26] MHz, and [32 36] MHz. In this example, the beam pair 802 may have up to 13 dB higher channel gain in a part of the band even though the average gain is higher for the beam pair 801. With the provided embodiments herein, the TRP may select the TRP beam in the beam pair 802 if the UE 102 is scheduled in one of these sub-bands. Similar observations may be made for the other channel realizations in plots 2-4, wherein plot 2 is shown in FIG. 8b, plot 3 is shown in FIG. 8c and plot 4 is shown in FIG. 8d.

Figure 9A:
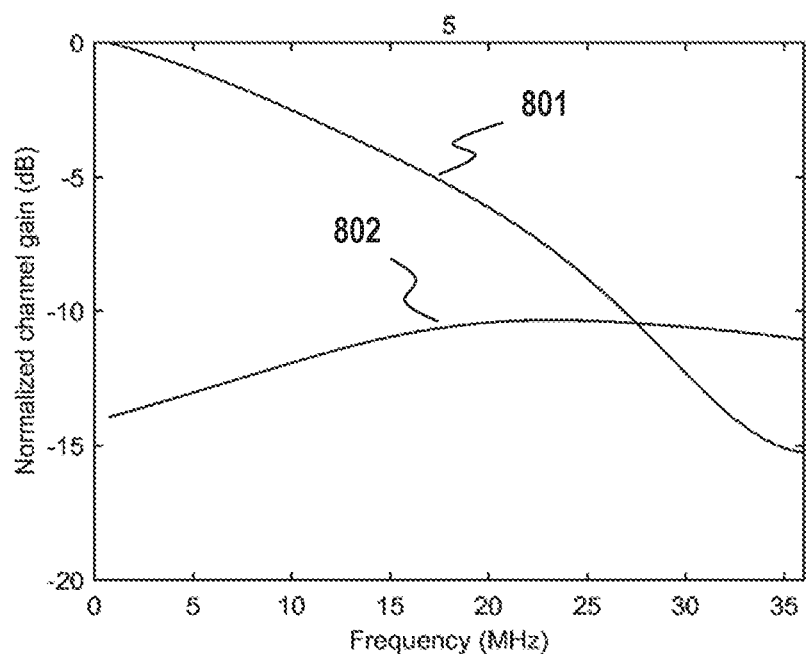
FIGS. 9a-b are diagrams showing examples of frequency according embodiments herein.
Figure 9B:
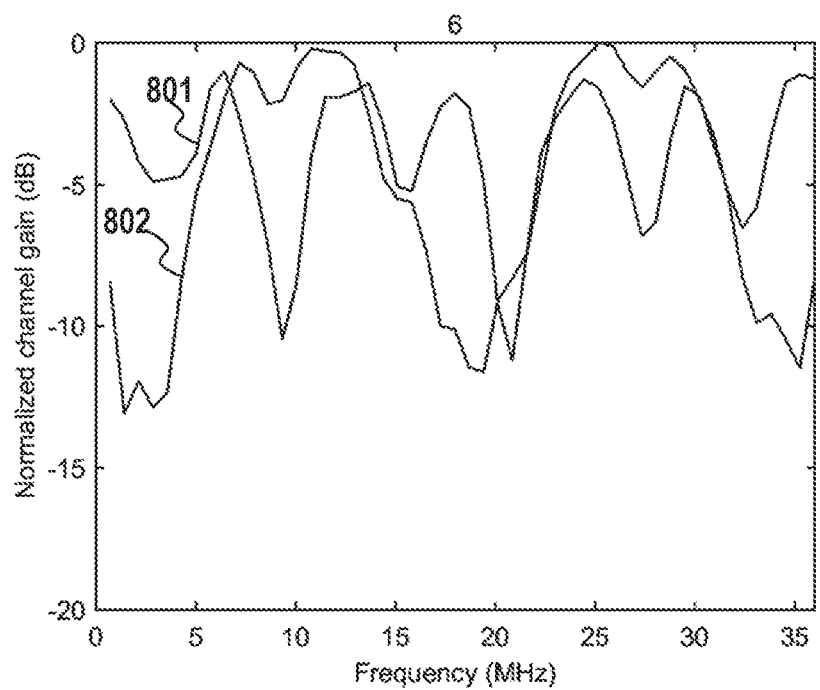

The channel realizations shown in are for Non-Line-of-Sight (NLoS) channels where the frequency selectivity may be quite high. Line-of-sight (LOS) channels typically have lower frequency selectivity. However, frequency selectivity still exists since also LoS channels have multipath components. FIGS. 9a, b, shows two realizations of LoS channels using the same channel model as in FIGS. 8a, b, c and d. The plot illustrated in FIG. 9a is a LoS channel for an outdoor UE which e.g. may be the UE 102, and the plot illustrated in FIG. 9b is a LoS channel for an indoor UE which also may be the UE 102. Although the outdoor UE has relatively low frequency selectivity, there exists a beam pair also in this case which has higher channel gain than the overall best beam pair in a part of the band, [27 36] MHz. Therefore, embodiments herein are useful for NLoS as well as LoS UEs, e.g. useful for the UE 102 when being an NLoS UE as well as being a LoS UE, or e.g. useful for the UE 102 when being indoor as well as being outdoor.

The example aspects of the disclosure presented below may be included in and/or may add features to one or more embodiments presented in the disclosure above. In some cases, the example aspects of the disclosure presented below form aspects of one or more embodiments that are at least partially distinct from the one or more embodiments presented above.

Figure 10:
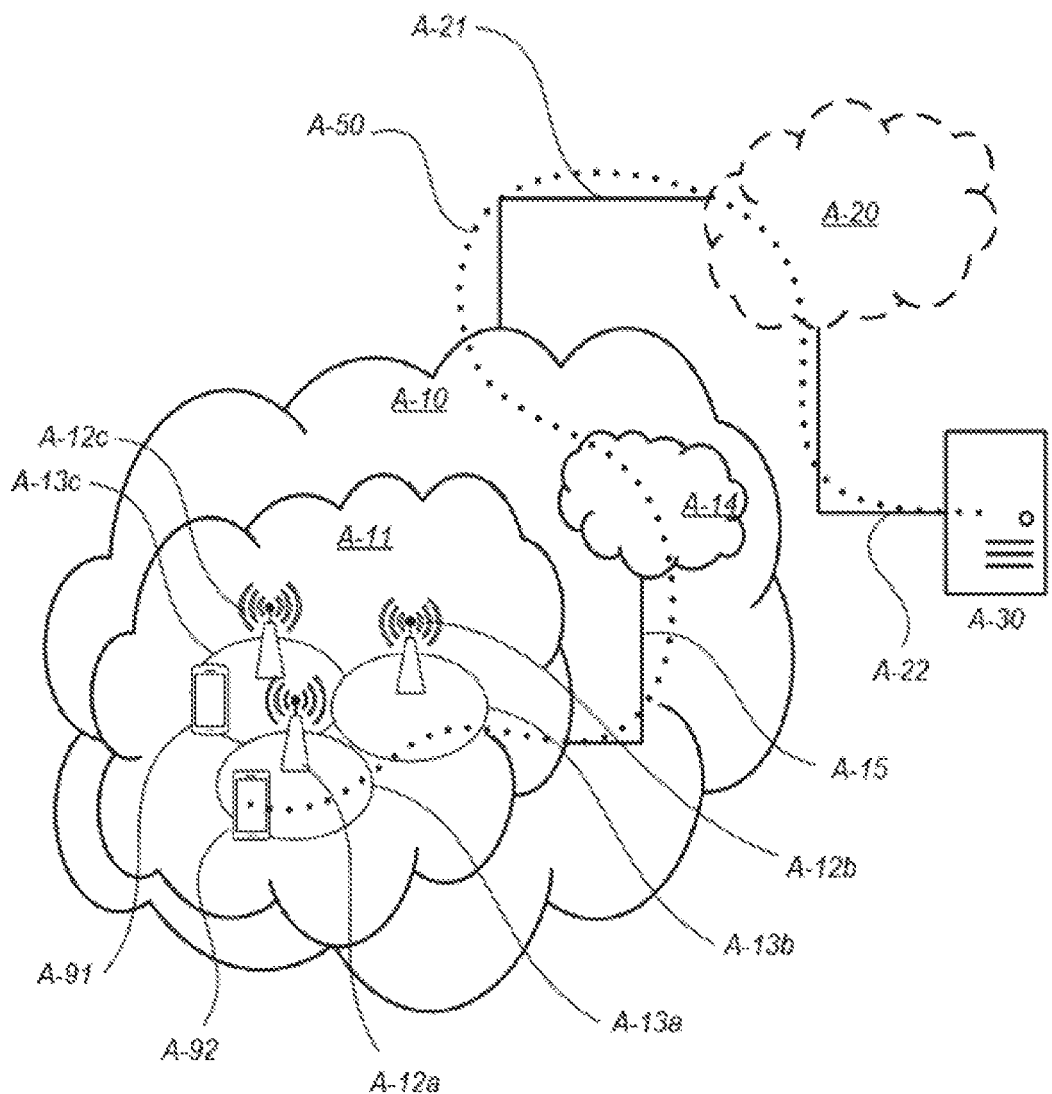
FIG. 10 schematically illustrates a telecommunication network connected via an intermediate network to a host computer.

FIG. 10 schematically illustrates a telecommunication network connected via an intermediate network to a host computer.

With reference to FIG. 10, in accordance with an embodiment, a communication system includes a telecommunication network A-10, such as a 3GPP-type cellular network, which comprises an access network A-11, such as a radio access network, and a core network A-14. The access network A-11 comprises a plurality of base stations A-12a, A-12b, A-12c, such as NBs, eNBs, gNBs or other types of wireless access points, each defining a corresponding coverage area A-13a, A-13b, A-13c. In an aspect, any of base stations A-12a, A-12b, A-12c, or any other base stations described herein may be considered to be a network node, for instance, if such as network node is described above in the present Application. Each base station A-12a, A-12b, A-12c is connectable to the core network A-14 over a wired or wireless connection A-15. A first user equipment (UE) A-91 located in coverage area A-13c is configured to wirelessly connect to, or be paged by, the corresponding base station A-12c. A second UE A-92 in coverage area A-13a is wirelessly connectable to the corresponding base station A-12a. While a plurality of UEs A-91, A-92 are illustrated in this example, the disclosed embodiments are equally applicable to a situation where a sole UE is in the coverage area or where a sole UE is connecting to the corresponding base station A-12. In an aspect, any of these UEs, or any other UE described herein may be considered to be configured to perform the aspects of any UE, user terminal, client device, or mobile device described above in the present Application.

The telecommunication network A-10 is itself connected to a host computer A-30, which may be embodied in the hardware and/or software of a standalone server, a cloud-implemented server, a distributed server or as processing resources in a server farm. The host computer A-30 may be under the ownership or control of a service provider, or may be operated by the service provider or on behalf of the service provider. The connections A-21, A-22 between the telecommunication network A-10 and the host computer A-30 may extend directly from the core network A-14 to the host computer A-30 or may go via an optional intermediate network A-20. The intermediate network A-20 may be one of, or a combination of more than one of, a public, private or hosted network; the intermediate network A-20, if any, may be a backbone network or the Internet; in particular, the intermediate network A-20 may comprise two or more sub-networks (not shown).

The communication system of FIG. 10 as a whole enables connectivity between one of the connected UEs A-91, A-92 and the host computer A-30, The connectivity may be described as an Over-The-Top (OTT) connection A-50. The host computer A-30 and the connected UEs A-91, A-92 are configured to communicate data and/or signaling via the OTT connection A-50, using the access network A-11, the core network A-14, any intermediate network A-20 and possible further infrastructure (not shown) as intermediaries. The OTT connection A-50 may be transparent in the sense that the participating communication devices through which the OTT connection A-50 passes are unaware of routing of uplink and downlink communications. For example, a base station A-12 may not or need not be informed about the past routing of an incoming downlink communication with data originating from a host computer A-30 to be forwarded (e.g., handed over) to a connected UE A-91. Similarly, the base station A-12 need not be aware of the future routing of an outgoing uplink communication originating from the UE A-91 towards the host computer A-30.

Figure 11:
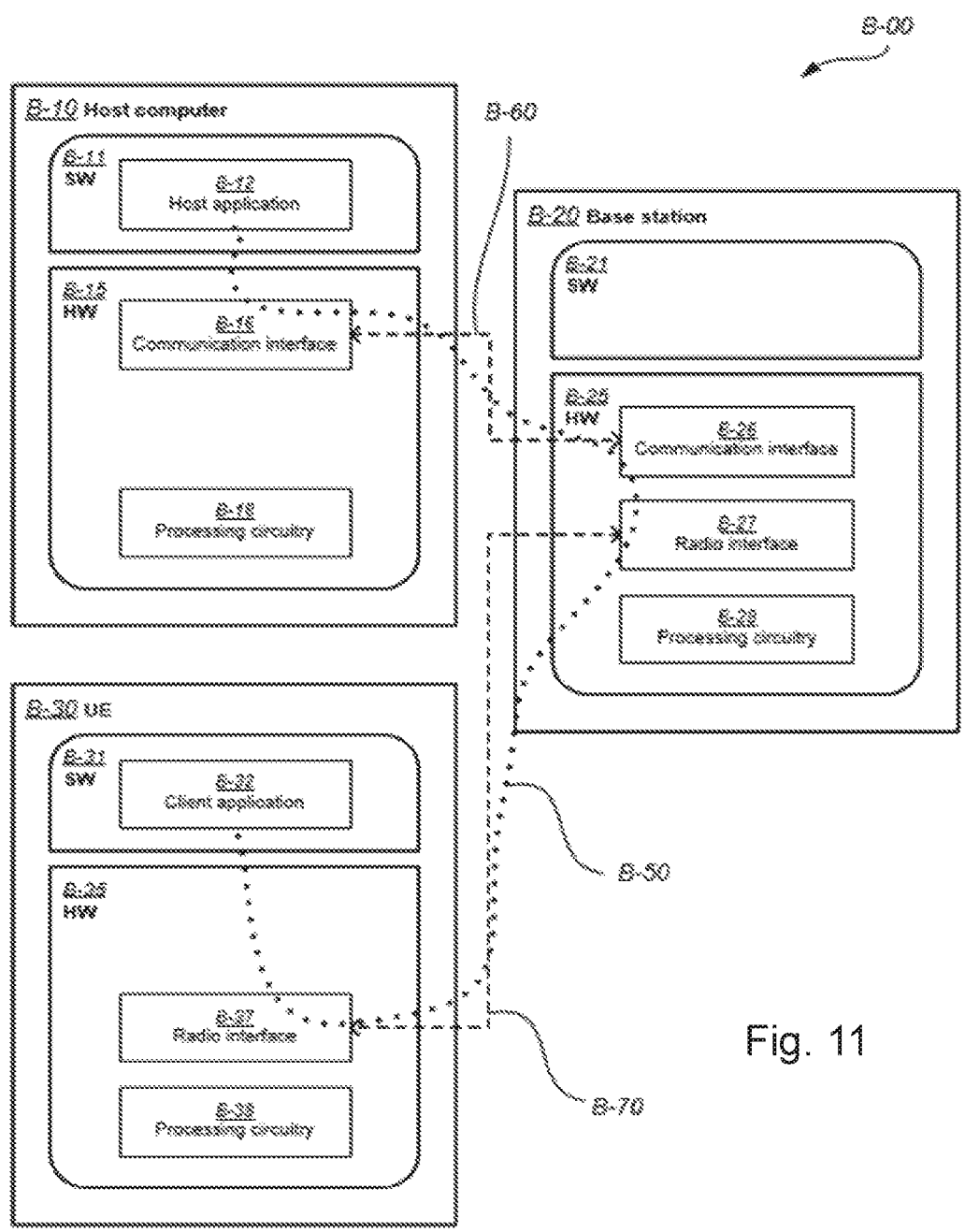
FIG. 11 is a generalized block diagram of a host computer communicating via a base station with a UE over a partially wireless connection.

Example implementations, in accordance with an embodiment, of the UE, base station and host computer discussed in the preceding paragraphs will now be described with reference to FIG. 11, which is shown below, FIG. 11 is a generalized block Diagram of a host computer communicating via a base station with a user equipment over a partially wireless connection.

In a communication system B-00, a host computer B-10 comprises hardware B-15 including a communication interface B-16 configured to set up and maintain a wired or wireless connection with an interface of a different communication device of the communication system B-00. The host computer B-10 further comprises processing circuitry B-18, which may have storage and/or processing capabilities. In particular, the processing circuitry B-18 may comprise one or more programmable processors, application-specific integrated circuits, field programmable gate arrays or combinations of these (not shown) adapted to execute instructions. The host computer B-10 further comprises software B-11, which is stored in or accessible by the host computer B-10 and executable by the processing circuitry B-18. The software B-11 includes a host application B-12. The host application B-12 may be operable to provide a service to a remote user, such as a UE B-30 connecting via an OTT connection B-50 terminating at the UE B-30 and the host computer B-10. In providing the service to the remote user, the host application B-12 may provide user data which is transmitted using the OTT connection B-50.

The communication system B-00 further includes a base station B-20 provided in a telecommunication system and comprising hardware B-25 enabling it to communicate with the host computer B-10 and with the UE B-30. The hardware B-25 may include a communication interface B-26 for setting up and maintaining a wired or wireless connection with an interface of a different communication device of the communication system B-00, as well as a radio interface B-27 for setting up and maintaining at least a wireless connection B-70 with a UE B-30 located in a coverage area (not shown in FIG. 11) served by the base station B-20.

The communication interface B-26 may be configured to facilitate a connection B-60 to the host computer B-10. The connection B-60 may be direct or it may pass through a core network (not shown in FIG. 11) of the telecommunication system and/or through one or more intermediate networks outside the telecommunication system. In the embodiment shown, the hardware B-25 of the base station B-20 further includes processing circuitry B-28, which may comprise one or more programmable processors, application-specific integrated circuits, field programmable gate arrays or combinations of these (not shown) adapted to execute instructions. The base station B-20 further has software B-21 stored internally or accessible via an external connection.

The communication system B-00 further includes the UE B-30, which has already been referred to above. Its hardware B-35 may include a radio interface B-37 configured to set up and maintain a wireless connection B-70 with a base station serving a coverage area in which the UE B-30 is currently located. The hardware B-35 of the UE B-30 further includes processing circuitry B-38, which may comprise one or more programmable processors, application-specific integrated circuits, field programmable gate arrays or combinations of these (not shown) adapted to execute instructions. The UE B-30 further comprises software B-31, which is stored in or accessible by the UE B-30 and executable by the processing circuitry B-38.

The software B-31 includes a client application B-32. The client application B-32 may be operable to provide a service to a human or non-human user via the UE B-30, with the support of the host computer B-10. In the host computer B-10, an executing host application B-12 may communicate with the executing client application B-32 via the OTT connection B-50 terminating at the UE B-30 and the host computer B-10. In providing the service to the user, the client application B-32 may receive request data from the host application B-12 and provide user data in response to the request data. The OTT connection B-50 may transfer both the request data and the user data. The client application B-32 may interact with the user to generate the user data that it provides.

It is noted that the host computer B-10, base station B-20 and UE B-30 illustrated in FIG. 11 may be identical to the host computer A-30, one of the base stations A-12a, A-12b, A-12c and one of the UEs A-91, A-92 of FIG. 10, respectively. This is to say, the inner workings of these entities may be as shown in FIG. 11 and independently, the surrounding network topology may be that of FIG. 10.

In FIG. 11, the OTT connection B-50 has been drawn abstractly to illustrate the communication between the host computer B-10 and the use equipment B-30 via the base station B-20, without explicit reference to any intermediary devices and the precise routing of messages via these devices. Network infrastructure may determine the routing, which it may be configured to hide from the UE B-30 or from the service provider operating the host computer B-10, or both. While the OTT connection B-50 is active, the network infrastructure may further take decisions by which it dynamically changes the routing (e.g., on the basis of load balancing consideration or reconfiguration of the network).

The wireless connection B-70 between the UE B-30 and the base station B-20 is in accordance with the teachings of the embodiments described throughout this disclosure. One or more of the various embodiments improve the performance of OTT services provided to the UE B-30 using the OTT connection B-50, in which the wireless connection B-70 forms the last segment. More precisely, the teachings of these embodiments may improve one or more of data rate, latency, and/or power consumption associated with one or more devices and/or communications of/performed in communication system B-00, and thereby may provide benefits for OTT user data communication, such as one or more of reduced user waiting time, relaxed restriction on file size, better responsiveness, and/or extended battery lifetime.

A measurement procedure may be provided for the purpose of monitoring data rate, latency and other factors on which the one or more embodiments improve. There may further be an optional network functionality for reconfiguring the OTT connection B-50 between the host computer B-10 and UE B-30, in response to variations in the measurement results. The measurement procedure and/or the network functionality for reconfiguring the OTT connection B-50 may be implemented in the software B-11 of the host computer B-10 or in the software B-31 of the UE B-30, or both.

In embodiments, sensors (not shown) may be deployed in or in association with communication devices through which the OTT connection B-50 passes; the sensors may participate in the measurement procedure by supplying values of the monitored quantities exemplified above, or supplying values of other physical quantities from which software B-11, B-31 may compute or estimate the monitored quantities. The reconfiguring of the OTT connection B-50 may include message format, retransmission settings, preferred routing etc.; the reconfiguring need not affect the base station B-20, and it may be unknown or imperceptible to the base station B-20.

Such procedures and functionalities may be known and practiced in the art. In certain embodiments, measurements may involve proprietary UE signaling facilitating the host computer's B-10 measurements of throughput, propagation times, latency and the like. The measurements may be implemented in that the software B-11, B-31 causes messages to be transmitted, in particular empty or 'dummy' messages, using the OTT connection B-50 while it monitors propagation times, errors etc.

FIGS. 12-15 are flowcharts illustrating methods implemented in a communication system including a host computer, a base station and a user equipment.

Figure 12:
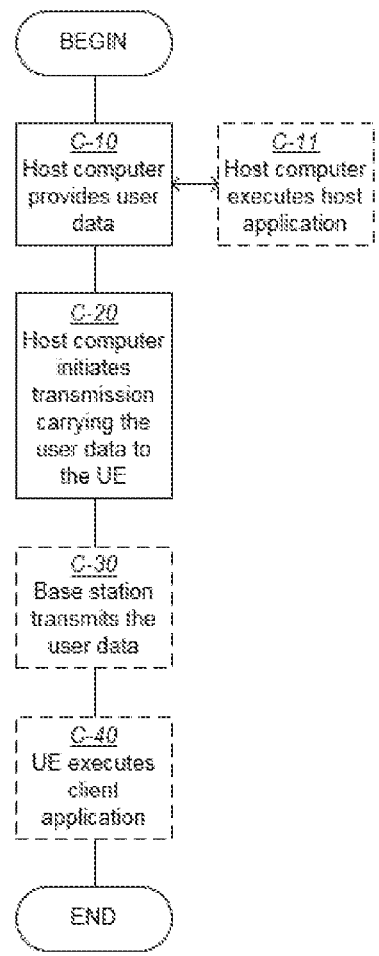
FIGS. 12-15 are flowcharts illustrating methods implemented in a communication system including a host computer, a base station and a UE.

FIG. 12 is a flowchart illustrating a method implemented in a communication system, in accordance with one embodiment.

The communication system includes a host computer, a base station and a UE which may be those described with reference to FIGS. 10-11. For simplicity of the present disclosure, only drawing references to FIG. 12 will be included in this section. In a first step C-10 of the method, the host computer provides user data.

In an optional substep C-11 of the first step C-10, the host computer provides the user data by executing a host application. In a second step C-20, the host computer initiates a transmission carrying the user data to the UE.

In an optional third step C-30, the base station transmits to the UE the user data which was carried in the transmission that the host computer initiated, in accordance with the teachings of the embodiments described throughout this disclosure. In an optional fourth step C-40, the UE executes a client application associated with the host application executed by the host computer.

Figure 13:
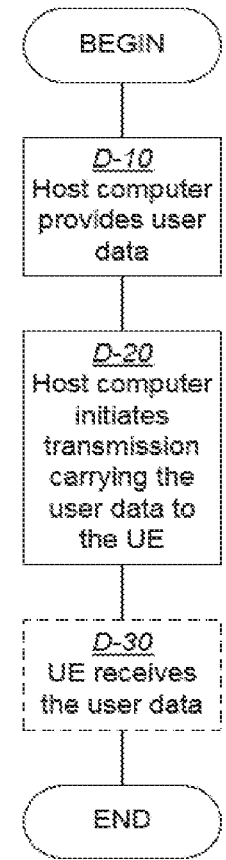

FIG. 13 is a flowchart illustrating a method implemented in a communication system, in accordance with one embodiment.

The communication system includes a host computer, a base station and a UE which may be those described with reference to FIGS. 10 and 11. For simplicity of the present disclosure, only drawing references to FIG. 13 will be included in this section. In a first step D-10 of the method, the host computer provides user data.

In an optional substep (not shown) the host computer provides the user data by executing a host application. In a second step D-20, the host computer initiates a transmission carrying the user data to the UE. The transmission may pass via the base station, in accordance with the teachings of the embodiments described throughout this disclosure. In an optional third step D-30, the UE receives the user data carried in the transmission.

Figures 14, 15:
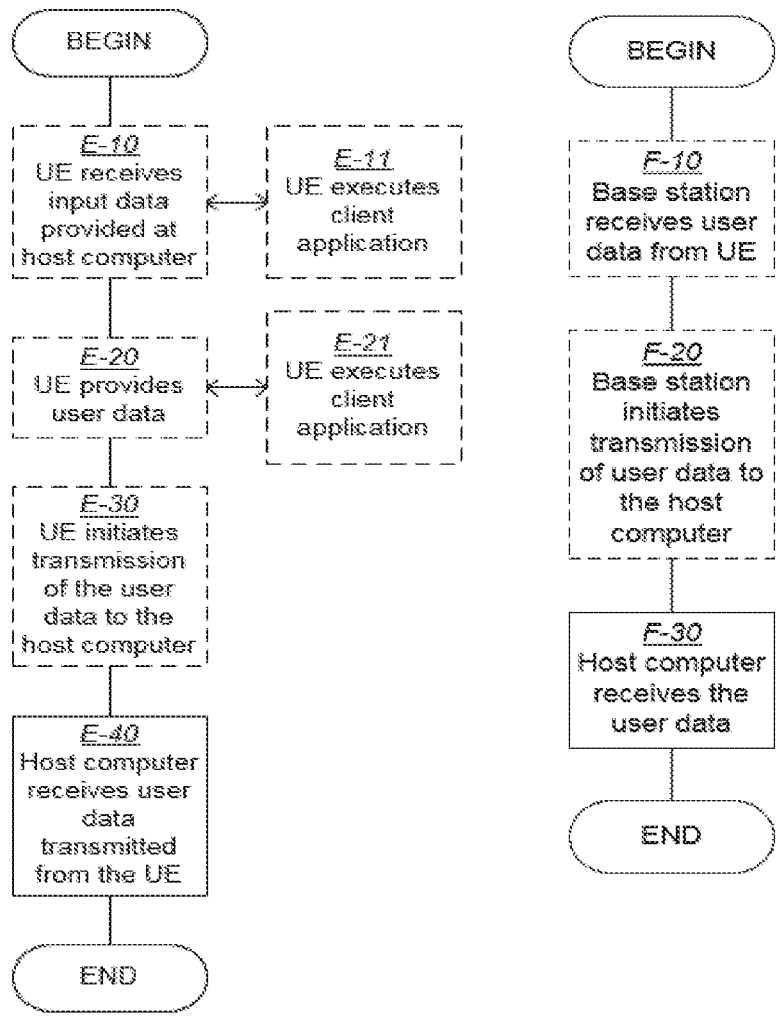

FIG. 14 is a flowchart illustrating a method implemented in a communication system, in accordance with one embodiment.

The communication system includes a host computer, a base station and a UE which may be those described with reference to FIGS. 10 and 11. For simplicity of the present disclosure, only drawing references to FIG. 14 will be included in this section. In an optional first step E-10 of the method, the UE receives input data provided by the host computer. Additionally or alternatively, in an optional second step E-20, the UE provides user data. In an optional substep E-21 of the second step E-20, the UE provides the user data by executing a client application. In a further optional substep E-11 of the first step E-10, the UE executes a client application which provides the user data in reaction to the received input data provided by the host computer. In providing the user data, the executed client application may further consider user input received from the user. Regardless of the specific manner in which the user data was provided, the UE initiates, in an optional third substep E-30, transmission of the user data to the host computer. In a fourth step E-40 of the method, the host computer receives the user data transmitted from the UE, in accordance with the teachings of the embodiments described throughout this disclosure.

FIG. 15 is a flowchart illustrating a method implemented in a communication system, in accordance with one embodiment.

The communication system includes a host computer, a base station and a UE which may be those described with reference to FIGS. 10 and 11. For simplicity of the present disclosure, only drawing references to FIG. 15 will be included in this section. In an optional first step F-10 of the method, in accordance with the teachings of the embodiments described throughout this disclosure, the base station receives user data from the UE. In an optional second step F-20, the base station initiates transmission of the received user data to the host computer. In a third step F-30, the host computer receives the user data carried in the transmission initiated by the base station.

EXAMPLE EMBODIMENTS

1. A method performed by a user equipment (UE), comprising:
obtaining a beam reporting configuration defining a beam reporting procedure for determining an optimal beam for each of different sub-bands of a system bandwidth;
measuring, according to the beam reporting configuration, different reference signals transmitted by the network node corresponding to each of the different sub-bands; and
determining a preferred beam for each of the different sub-bands based on the corresponding received reference signals.

2. The method of embodiment 1, further comprising receiving a triggering signal for starting the beam reporting procedure at the UE.

3. The method of embodiment 2, wherein receiving the triggering signal is based on a data requirement of the UE and an available portion of the system bandwidth.

4. The method of embodiment 2, wherein the triggering signal is transmitted to the UE in Downlink Control Information (DCI).

5. The method of any of the previous embodiments, wherein the beam reporting configuration is signaled to the UE via Radio Resource Control (RRC) signaling.

6. The method of embodiment 1, wherein the beam reporting configuration comprises one or more parameters corresponding to one or more of frequency granularity of the different sub-bands, a number of beams usable by the network node, and Reference Signal Received Power (RSRP) and/or Channel Quality Indicator (CQI) reporting.

7. The method of any of the previous embodiments, further comprising transmitting a beam reporting message to the network node, the beam reporting message indicating the preferred beam for each of the different sub-bands.

8. The method of embodiment 7, wherein the beam reporting message further indicates a wideband preferred beam for the system bandwidth as a whole.

9. The method of embodiment 7, wherein the beam reporting message further indicates one or more RSRP values and/or CQI values associated with the measured reference signals.

10. The method of any of the previous embodiments, wherein the different reference signals comprise different Channel State Information Reference Signals (CSI-RS).

11. A user equipment (UE), comprising one or more processing circuits and at least one memory, wherein the one or more processing circuits are configured to execute at least one instruction stored on the at least one memory such that the UE is configured to:
obtain a beam reporting configuration defining a beam reporting procedure for determining an optimal beam for each of different sub-bands of a system bandwidth;
measure, according to the beam reporting configuration, different reference signals transmitted by the network node corresponding to each of the different sub-bands; and
determine a preferred beam for each of the different sub-bands based on the corresponding received reference signals.

12. The UE of embodiment 11, wherein the one or more processing circuits are configured to execute at least one instruction stored on the at least one memory such that the UE is configured to perform the aspects of any of embodiments 2-9.

13. A user equipment (UE) device configured to:
obtain a beam reporting configuration defining a beam reporting procedure for determining an optimal beam for each of different sub-bands of a system bandwidth;
measure, according to the beam reporting configuration, different reference signals transmitted by the network node corresponding to each of the different sub-bands; and determine a preferred beam for each of the different sub-bands based on the corresponding received reference signals.

14. The UE of embodiment 13, further configured to perform the aspects of any of embodiments 2-10.

15. A user equipment (UE), comprising:
a first module or unit configured to obtain a beam reporting configuration defining a beam reporting procedure for determining an optimal beam for each of different sub-bands of a system bandwidth;
a second module or unit configured to measure, according to the beam reporting configuration, different reference signals transmitted by the network node corresponding to each of the different sub-bands; and
a third module or unit configured to determine a preferred beam for each of the different sub-bands based on the corresponding received reference signals.

16. The UE of embodiment 15, further comprising one or more further modules or units configured to perform the aspects of any of embodiments 2-9.

17. A method performed by a network node, the method comprising:
determining a beam reporting configuration defining a beam reporting procedure to be utilized by a user equipment (UE) for determining an optimal beam for each of different sub-bands of a system bandwidth;
signaling the beam reporting configuration to the UE;
transmitting different reference signals to the UE according to the beam reporting configuration, the different reference signals corresponding to each of the different sub-bands; and
receiving a beam reporting message from the UE, the beam reporting message indicating a preferred beam for each of the different sub-bands.

18. The method of embodiment 17, further comprising transmitting, to the UE, a triggering signal for initializing the beam reporting procedure at the UE.

19. The method of embodiment 18, wherein the triggering signal is transmitted in Downlink Control Information (DCI).

20. The method of embodiment 18 or embodiment 19, wherein the triggering signal is transmitted based on a data requirement of the UE and an available portion of the system bandwidth.

21. The method of any of embodiments 17-20, wherein the beam reporting configuration is signaled to the UE via Radio Resource Control (RRC) signaling.

22. The method of any of embodiments 17-21, wherein the beam reporting configuration comprises one or more parameters corresponding to one or more of frequency granularity of the different sub-bands, a number of beams usable by the network node, or Reference Signal Received Power (RSRP) and/or Channel Quality Indicator (CQI) reporting.

23. The method of any of embodiments 17-22, wherein the different reference signals comprise different Channel State Information Reference Signals (CSI-RS).

24. The method of any of embodiments 17-23, wherein determining the beam reporting configuration comprises:
estimating a frequency selectivity associated with the system bandwidth; and
determining a frequency granularity defining the sub-bands within the system bandwidth based on the estimated frequency selectivity.

25. The method of embodiment 24, wherein estimating the frequency selectivity comprises obtaining a measured coherence bandwidth and/or reciprocal of delay spread.

26. The method of either of embodiment 24 or embodiment 25, wherein the frequency granularity defining the sub-bands is UE-specific, cell-specific, or common for a group of UEs with similar channel properties.

27. The method of any of embodiments 17-26, wherein the beam reporting message further indicates one or more RSRP values and/or CQI values associated with the reference signals measured at the UE.

28. The method of any of embodiments 17-27, wherein the beam reporting message further indicates a wideband preferred beam for the system bandwidth as a whole.

29. A network node comprising one or more processing circuits and at least one memory, wherein the one or more processing circuits are configured to execute at least one instruction stored on the at least one memory such that the network node is configured to:
determine a beam reporting configuration defining a beam reporting procedure to be utilized by a user equipment (UE) for determining an optimal beam for each of different sub-bands of a system bandwidth;
signal the beam reporting configuration to the UE;
transmit different reference signals to the UE according to the beam reporting configuration, the different reference signals corresponding to each of the different sub-bands; and
receive a beam reporting message from the UE, the beam reporting message indicating a preferred beam for each of the different sub-bands.

30. The network node of embodiment 29, wherein the one or more processing circuits are configured to execute at least one instruction stored on the at least one memory such that the network node is configured to perform the aspects of any of embodiments 17-27.

31. A network node configured to:
determine a beam reporting configuration defining a beam reporting procedure to be utilized by a user equipment (UE) for determining an optimal beam for each of different sub-bands of a system bandwidth;
signal the beam reporting configuration to the UE;
transmit different reference signals to the UE according to the beam reporting configuration, the different reference signals corresponding to each of the different sub-bands; and
receive a beam reporting message from the UE, the beam reporting message indicating a preferred beam for each of the different sub-bands.

32. The network node of embodiment 31, further configured to perform the aspects of any of embodiments 17-27.

33. A network node comprising:
a first module or unit configured to determine a beam reporting configuration defining a beam reporting procedure to be utilized by a user equipment (UE) for determining an optimal beam for each of different sub-bands of a system bandwidth;
a second module or unit configured to signal the beam reporting configuration to the UE;
a third module or unit configured to transmit different reference signals to the UE according to the beam reporting configuration, the different reference signals corresponding to each of the different sub-bands; and
a fourth module or unit configured to receive a beam reporting message from the UE, the beam reporting message indicating a preferred beam for each of the different sub-bands.

34. The network node of embodiment 33, further comprising one or more modules or units configured to perform the aspects of any of embodiments 17-27.

35. A computer-readable medium, storing processor-executable instructions that when executed by a processor, perform the aspects of any of the above embodiments.

36. A computer program and/or signal comprising instructions that when executed by a processor, perform the aspects of any of the above embodiments.

ADDITIONAL EXAMPLE EMBODIMENTS

The following additional example embodiments are meant to be non-limiting, and may serve as an addendum to any other example embodiments, numbered embodiments, or example claims listed or otherwise described (explicitly or implicitly) throughout the present application and disclosure.

A-1. A base station configured to communicate with a user equipment (UE), the base station comprising a radio interface and processing circuitry configured to perform aspects of example embodiments described throughout the present disclosure.

A-2. A communication system including a host computer comprising:
processing circuitry configured to provide user data; and
a communication interface configured to forward the user data to a cellular network for transmission to a user equipment (UE),
wherein the cellular network comprises a base station having a radio interface and processing circuitry, the base station's processing circuitry configured to perform aspects of example embodiments described throughout the present disclosure, including aspects related to forwarding the user data to the UE.

A-3. The communication system of embodiment A-2, further including the base station.

A-4. The communication system of embodiment A-3, further including the UE, wherein the UE is configured to communicate with the base station.

A-5. The communication system of embodiment A-4, wherein;
the processing circuitry of the host computer is configured to execute a host application, thereby providing the user data; and
the UE comprises processing circuitry configured to execute a client application associated with the host application.

A-6. A method implemented in a base station, comprising aspects of example embodiments described throughout the present disclosure, including aspects related to transmitting user data to a UE.

A-7. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the base station is configured to perform aspects of example embodiments described throughout the present disclosure, included aspects related to transmitting the user data to the UE.

A-8. The method of embodiment A-7, further comprising:
at the base station, transmitting the user data.

A-9, The method of embodiment A-8, wherein the user data is provided at the host computer by executing a host application, the method further comprising:
at the UE, executing a client application associated with the host application.

A-10. A user equipment (UE) configured to communicate with a base station, the UE comprising a radio interface and processing circuitry configured to perform aspects of example embodiments described throughout the present disclosure, including aspects related to receiving user data from the base station.

A-11. A communication system including a host computer comprising:
processing circuitry configured to provide user data; and
a communication interface configured to forward user data to a cellular network for transmission to a user equipment (UE),
wherein the UE comprises a radio interface and processing circuitry, the UE's processing circuitry configured to perform aspects of example embodiments described throughout the present disclosure, including aspects related to the UE receiving the user data from the base station.

A-12. The communication system of embodiment A-11, further including the UE.

A-13, The communication system of embodiment A-12, wherein the cellular network further includes a base station configured to communicate with the UE.

A-14. The communication system of embodiment A-12 or A-13, wherein:
the processing circuitry of the host computer is configured to execute a host application, thereby providing the user data; and
the UE's processing circuitry is configured to execute a client application associated with the host application.

A-15. A method implemented in a user equipment (UE), comprising aspects of example embodiments described throughout the present disclosure, including aspects related to the UE receiving user data from a base station.

A-16. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the UE is configured to perform aspects of example embodiments described throughout the present disclosure, including aspects related to the UE receiving the user data from the base station.

A-17. The method of embodiment A-16, further comprising:
at the UE, receiving the user data from the base station.

A-18. A user equipment (UE) configured to communicate with a base station, the UE comprising a radio interface and processing circuitry configured to perform aspects of example embodiments described throughout the present disclosure, including aspects related to the UE transmitting user data to the base station.

A-19. A communication system including a host computer comprising:
a communication interface configured to receive user data originating from a transmission from a user equipment (UE) to a base station,
wherein the UE comprises a radio interface and processing circuitry, the UE's processing circuitry configured to perform aspects of example embodiments described throughout the present disclosure, including aspects related to the UE transmitting user data to the base station.

A-20. The communication system of embodiment A-19, further including the UE.

A-21, The communication system of embodiment A-20, further including the base station, wherein the base station comprises a radio interface configured to communicate with the UE and a communication interface configured to forward to the host computer the user data carried by a transmission from the UE to the base station.

A-22. The communication system of embodiment A-20 or A-21, wherein:
the processing circuitry of the host computer is configured to execute a host application; and
the UE's processing circuitry is configured to execute a client application associated with the host application, thereby providing the user data.

A-23. The communication system of embodiment A-20 or A-21, wherein:
the processing circuitry of the host computer is configured to execute a host application, thereby providing request data; and
the UE's processing circuitry is configured to execute a client application associated with the host application, thereby providing the user data in response to the request data.

A-24. A method implemented in a user equipment (UE), comprising aspects of example embodiments described throughout the present disclosure, including aspects related to the UE transmitting user data to a base station.

A-25, The method of embodiment A-24, further comprising:
providing user data; and
forwarding the user data to a host computer via the transmission to the base station.

A-26. A method implemented in a communication system including a host computer, a base station and a user equipment (UE), the method comprising:
at the host computer, receiving user data transmitted to the base station from the UE, wherein the UE is configured to perform aspects of example embodiments described throughout the present disclosure, including aspects related to the UE transmitting user data to the base station.

A-27. The method of embodiment A-26, further comprising:
at the UE, providing the user data to the base station.

A-28. The method of embodiment A-27, further comprising:
at the UE, executing a client application, thereby providing the user data to be transmitted; and
at the host computer, executing a host application associated with the client application.

A-29. The method of embodiment A-27, further comprising:
at the UE, executing a client application; and
at the UE, receiving input data to the client application, the input data being provided at the host computer by executing a host application associated with the client application,
wherein the user data to be transmitted is provided by the client application in response to the input data.

A-30. A base station configured to communicate with a user equipment (UE), the base station comprising a radio interface and processing circuitry configured to perform aspects of example embodiments described throughout the present disclosure, including aspects related to the base station receiving user data from the UE.

A-31. A communication system including a host computer comprising a communication interface configured to receive user data originating from a transmission from a user equipment (UE) to a base station, wherein the base station comprises a radio interface and processing circuitry, the base station's processing circuitry configured to perform aspects of example embodiments described throughout the present disclosure, including aspects related to the base station receiving user data from the UE.

A-32. The communication system of embodiment A-31, further including the base station.

A-33. The communication system of embodiment A-32, further including the UE, wherein the UE is configured to communicate with the base station.

A-34. The communication system of embodiment A-33, wherein:
the processing circuitry of the host computer is configured to execute a host application;
the UE is configured to execute a client application associated with the host application, thereby providing the user data to be received by the host computer.

A-35. A method implemented in a base station, comprising perform aspects of example embodiments described throughout the present disclosure, including aspects related to the base station receiving user data from a user equipment (UE).

A-36. A method implemented in a communication system including a host computer, a base station and a user equipment (UE), the method comprising:
at the host computer, receiving, from the base station, user data originating from a transmission which the base station has received from the UE, wherein one or both of the base station and the UE are configured to perform aspects of example embodiments described throughout the present disclosure, including aspects related to the base station receiving user data from the UE and/or aspects related to the UE transmitting user data to the base station.

A-37. The method of embodiment A-36, further comprising:
at the base station, receiving the user data from the UE.

A-38. The method of embodiment A-37, further comprising:
at the base station, initiating a transmission of the received user data to the host computer.

The invention claimed is:

1. A method performed by a User Equipment (UE), the method comprising:
obtaining a beam reporting configuration defining a beam reporting procedure for determining an optimal beam for each of different sub-bands of a system bandwidth;
measuring, according to the beam reporting configuration, different reference signals transmitted by a network node corresponding to each of the different sub-bands; and
determining a preferred beam for each of the different sub-bands based on the corresponding received reference signals.

2. The method of claim 1, further comprising receiving a triggering signal for starting the beam reporting procedure at the UE.

3. The method of claim 2, wherein the receiving the triggering signal is based on a data requirement of the UE and an available portion of the system bandwidth.

4. The method of claim 2, wherein the triggering signal is transmitted to the UE in Downlink Control Information (DCI).

5. The method of claim 1, wherein the beam reporting configuration is signaled to the UE via Radio Resource Control (RRC) signaling.

6. The method of claim 1, wherein the beam reporting configuration comprises one or more parameters corresponding to one or more of: frequency granularity of the different sub-bands, a number of beams usable by the network node, Reference Signal Received Power (RSRP), and/or Channel Quality Indicator (CQI) reporting.

7. The method of claim 1, further comprising transmitting a beam reporting message to the network node, the beam reporting message indicating the preferred beam for each of the different sub-bands.

8. The method of claim 7, wherein the beam reporting message further indicates a wideband preferred beam for the system bandwidth as a whole.

9. The method of claim 7, wherein the beam reporting message further indicates one or more Reference Signal Received Power (RSRP) values and/or Channel Quality Indicator (CQI) values associated with the measured reference signals.

10. The method of claim 1, wherein the different reference signals comprise different Channel State Information Reference Signals (CSI-RS).

11. A User Equipment (UE), comprising:
processing circuitry;
memory containing instructions executable by the processing circuitry whereby the UE is operative to:
obtain a beam reporting configuration defining a beam reporting procedure for determining an optimal beam for each of different sub-bands of a system bandwidth;
measure, according to the beam reporting configuration, different reference signals transmitted by the network node corresponding to each of the different sub-bands; and
determine a preferred beam for each of the different sub-bands based on the corresponding received reference signals.

12. A method performed by a network node, the method comprising:

determining a beam reporting configuration defining a beam reporting procedure to be utilized by a User Equipment (UE) for determining an optimal beam for each of different sub-bands of a system bandwidth;

signaling the beam reporting configuration to the UE;

transmitting different reference signals to the UE according to the beam reporting configuration, the different reference signals corresponding to each of the different sub-bands; and receiving a beam reporting message from the UE, the beam reporting message indicating a preferred beam for each of the different sub-bands.

13. The method of claim 12, further comprising transmitting, to the UE, a triggering signal for initializing the beam reporting procedure at the UE.

14. The method of claim 13, wherein the triggering signal is transmitted in Downlink Control Information (DCI).

15. The method of claim 13, wherein the triggering signal is transmitted based on a data requirement of the UE and an available portion of the system bandwidth.

16. The method of claim 12, wherein the beam reporting configuration is signaled to the UE via Radio Resource Control (RRC) signaling.

17. The method of claim 12, wherein the beam reporting configuration comprises one or more parameters corresponding to one or more of: frequency granularity of the different sub-bands, a number of beams usable by the network node, Reference Signal Received Power (RSRP), and/or Channel Quality Indicator (CQI) reporting.

18. The method of claim 14, wherein the different reference signals comprise different Channel State Information Reference Signals (CSI-RS).

19. The method of claim 12, wherein the determining the beam reporting configuration comprises:

estimating a frequency selectivity associated with the system bandwidth; and determining a frequency granularity defining the sub-bands within the system bandwidth based on the estimated frequency selectivity.

20. The method of claim 19, wherein the estimating the frequency selectivity comprises obtaining a measured coherence bandwidth and/or reciprocal of delay spread.

21. The method of claim 19, wherein the frequency granularity defining the sub-bands is UE-specific, cell-specific, or common for a group of UEs with similar channel properties.

22. The method of claim 12, wherein the beam reporting message further indicates one or more Reference Signal Received Power (RSRP) values and/or Channel Quality Indicator (CQI) values associated with the reference signals measured at the UE.

23. The method of claim 12, wherein the beam reporting message further indicates a wideband preferred beam for the system bandwidth as a whole.

24. A network node, comprising:

processing circuitry;

memory containing instructions executable by the processing circuitry whereby the network node is operative to:

determine a beam reporting configuration defining a beam reporting procedure to be utilized by a User Equipment (UE) for determining an optimal beam for each of different sub-bands of a system bandwidth;

signal the beam reporting configuration to the UE;

transmit different reference signals to the UE according to the beam reporting configuration, the different reference signals corresponding to each of the different sub-bands; and receive a beam reporting message from the UE, the beam reporting message indicating a preferred beam for each of the different sub-bands.

* * * * *